(12) United States Patent
Yamakawa

(10) Patent No.: US 7,663,783 B2
(45) Date of Patent: *Feb. 16, 2010

(54) IMAGE-PROCESSING DEVICE PROCESSING IMAGE DATA BY JUDGING A DETECTED AND EXPANDED MEDIUM-DENSITY FIELD AS A NON-CHARACTER EDGE FIELD

(75) Inventor: Shinji Yamakawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 568 days.

This patent is subject to a terminal disclaimer.

(21) Appl. No.: 11/491,966

(22) Filed: Jul. 25, 2006

(65) Prior Publication Data

US 2006/0256383 A1  Nov. 16, 2006

Related U.S. Application Data

(63) Continuation of application No. 10/152,627, filed on May 23, 2002, now Pat. No. 7,139,100.

(30) Foreign Application Priority Data

May 25, 2001  (JP) ............................. 2001-157490

(51) Int. Cl.
  *G06K 15/00* (2006.01)
  *G06K 9/40* (2006.01)
(52) U.S. Cl. ....................... 358/3.1; 382/266
(58) Field of Classification Search ................. 358/3.1, 358/1.9, 3.03, 3.15, 3.27, 521, 530, 448, 358/461; 382/162, 166, 233, 254, 266, 274
See application file for complete search history.

(56) References Cited

U.S. PATENT DOCUMENTS

| 5,949,555 | A | * | 9/1999 | Sakai et al. ................. 358/462 |
| 7,024,047 | B2 | * | 4/2006 | Yamazaki .................... 382/242 |
| 2003/0048476 | A1 | * | 3/2003 | Yamakawa .................. 358/3.1 |
| 2003/0194147 | A1 | * | 10/2003 | Yamazaki .................... 382/266 |
| 2005/0041261 | A1 | * | 2/2005 | Narushima et al. ........... 358/1.9 |
| 2006/0182334 | A1 | * | 8/2006 | Akimoto ..................... 382/145 |

FOREIGN PATENT DOCUMENTS

| EP | 0 349 234 A2 | 1/1990 |
| EP | 0 899 685 A1 | 3/1999 |
| EP | 0 993 179 A2 | 4/2000 |
| EP | 1 101 619 A1 | 5/2001 |
| JP | 6-152945 | 5/1994 |
| JP | 10-108012 | 4/1998 |
| JP | 2002344242 | 12/2002 |

* cited by examiner

*Primary Examiner*—Jerome Grant, II
(74) *Attorney, Agent, or Firm*—Dickstein Shapiro LLP

(57) ABSTRACT

An image-processing device applies a predetermined process to input image data so as to output the processed image data. The image-processing device comprises a medium-density detection unit, an expansion unit, and a non-character edge judgment unit. The medium-density detection unit detects a medium-density field of an image represented by the image data. The expansion unit applies an expansion process to the medium-density field detected by the medium-density detection unit. The non-character edge judgment unit judges the medium-density field applied with the expansion process by the expansion unit as a non-character edge field of the image represented by the image data.

4 Claims, 25 Drawing Sheets

FIG.5
(A)
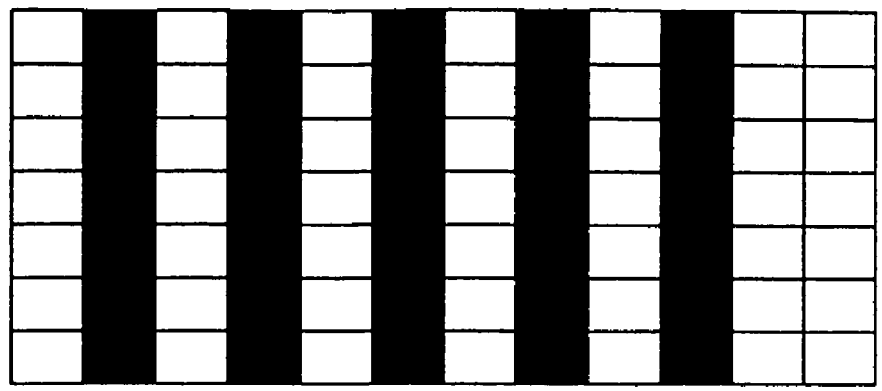
MULTIPLE-LINE PATTERN OF 600 dpi READ AT 600 dpi
(B)
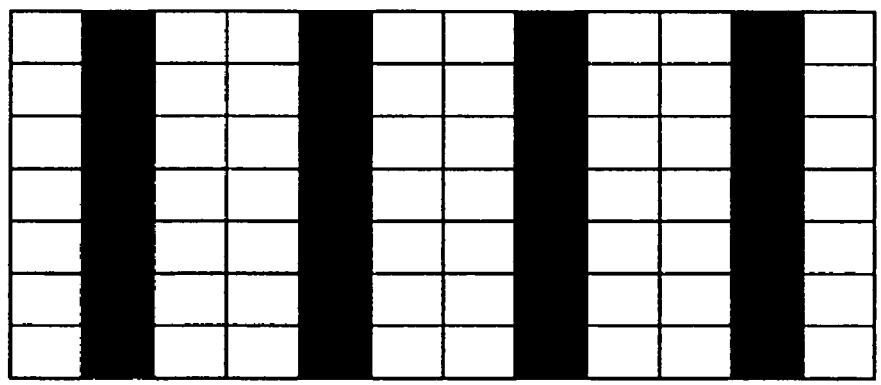
MULTIPLE-LINE PATTERN OF 400 dpi READ AT 600 dpi

FIG.8
WBP
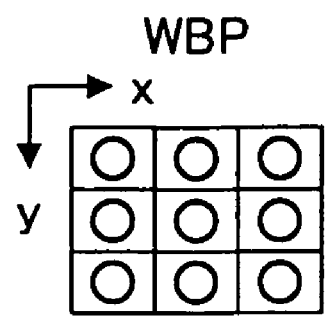
RDPa
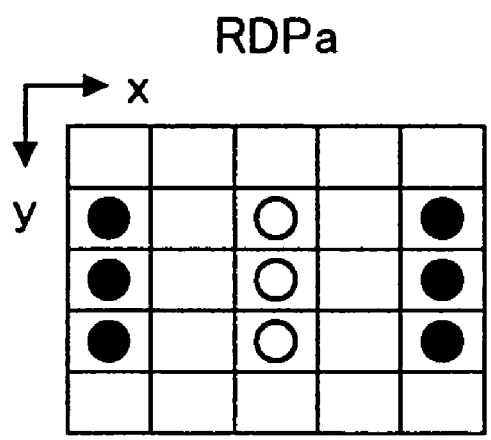
RDPb
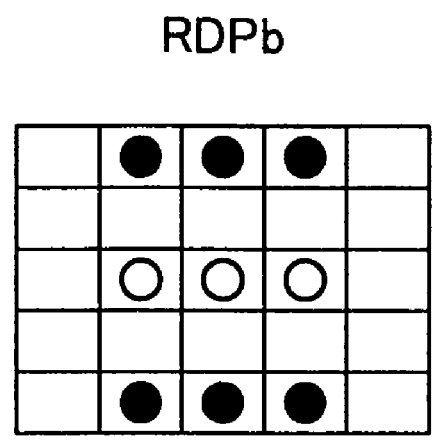

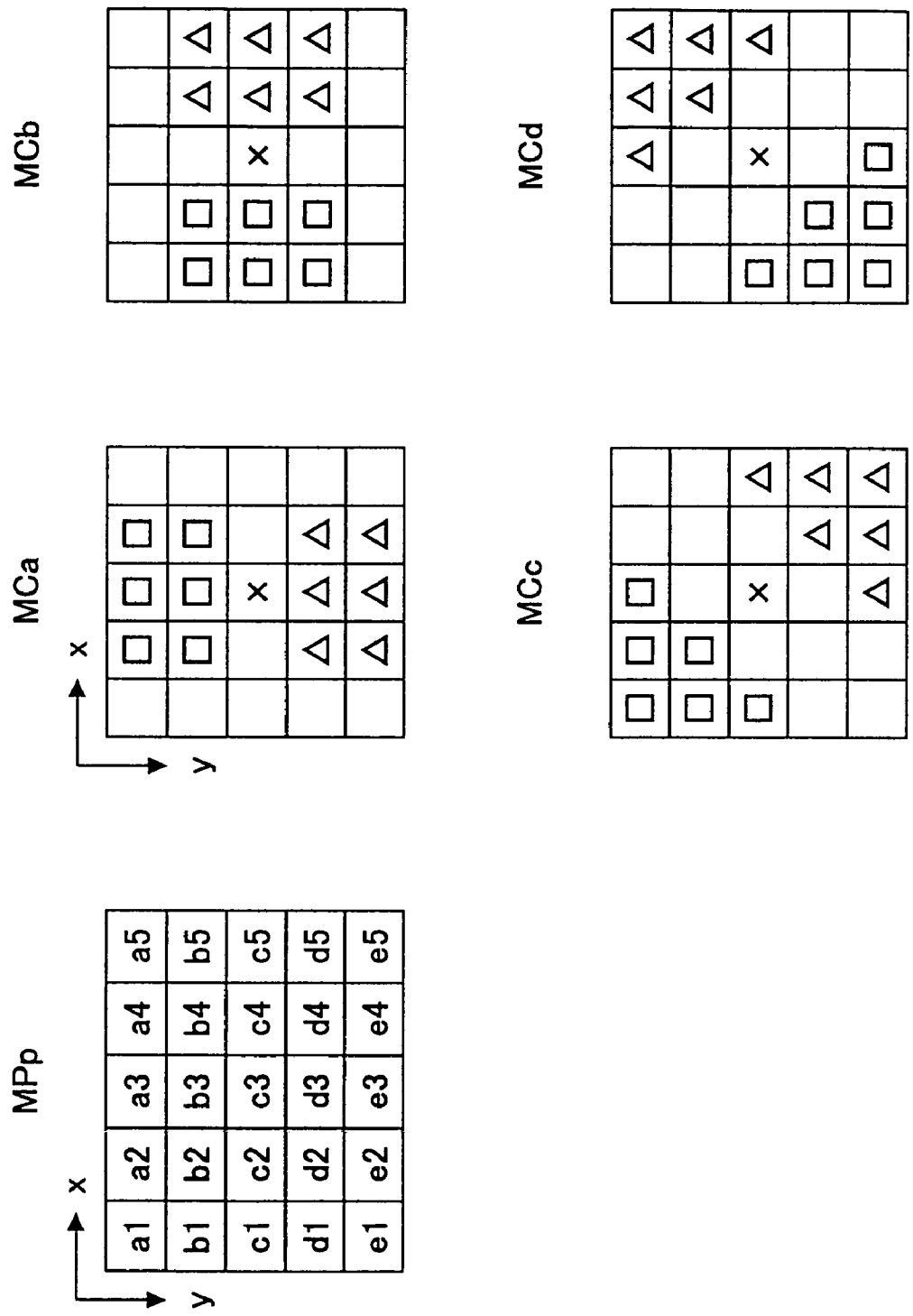

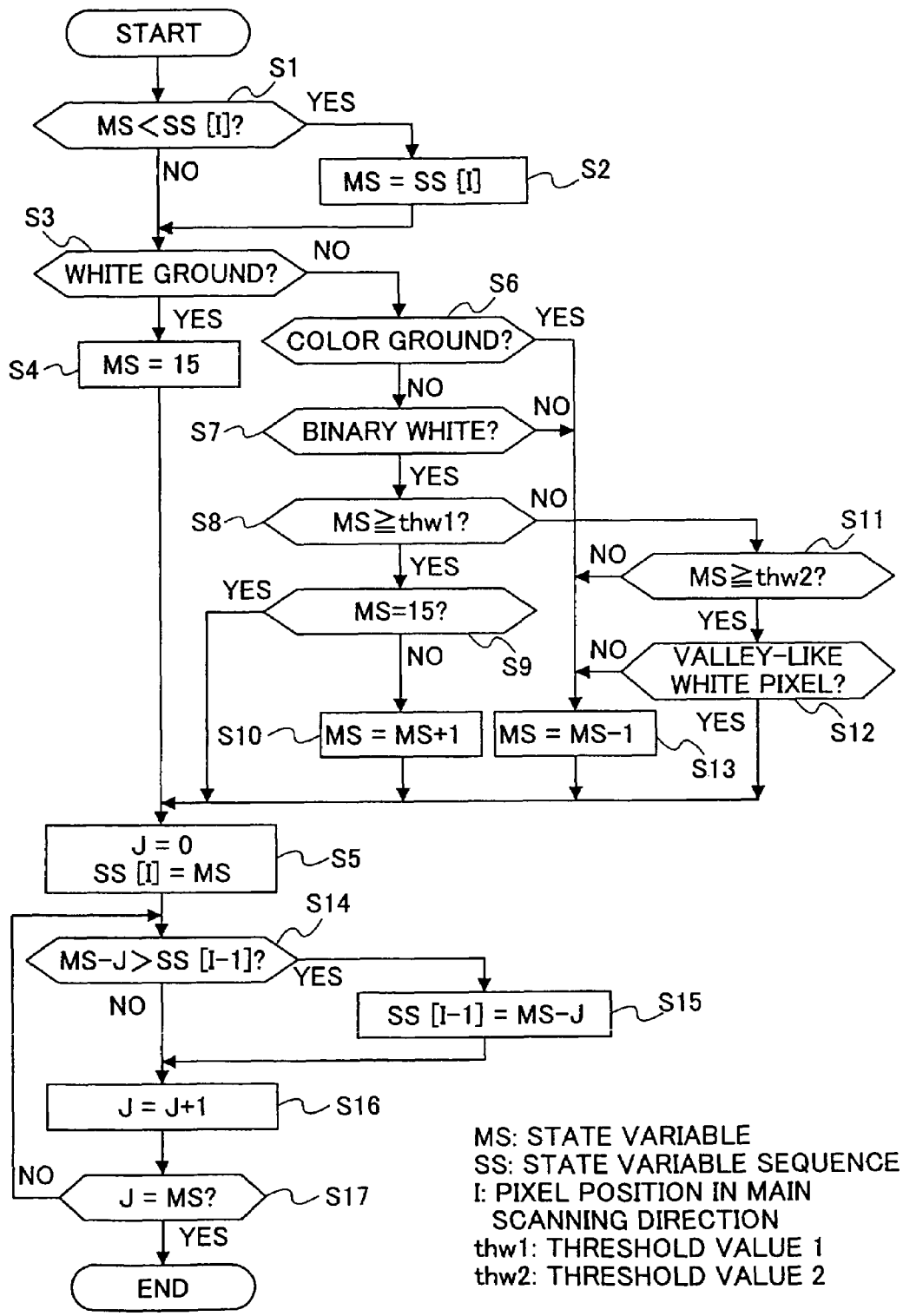

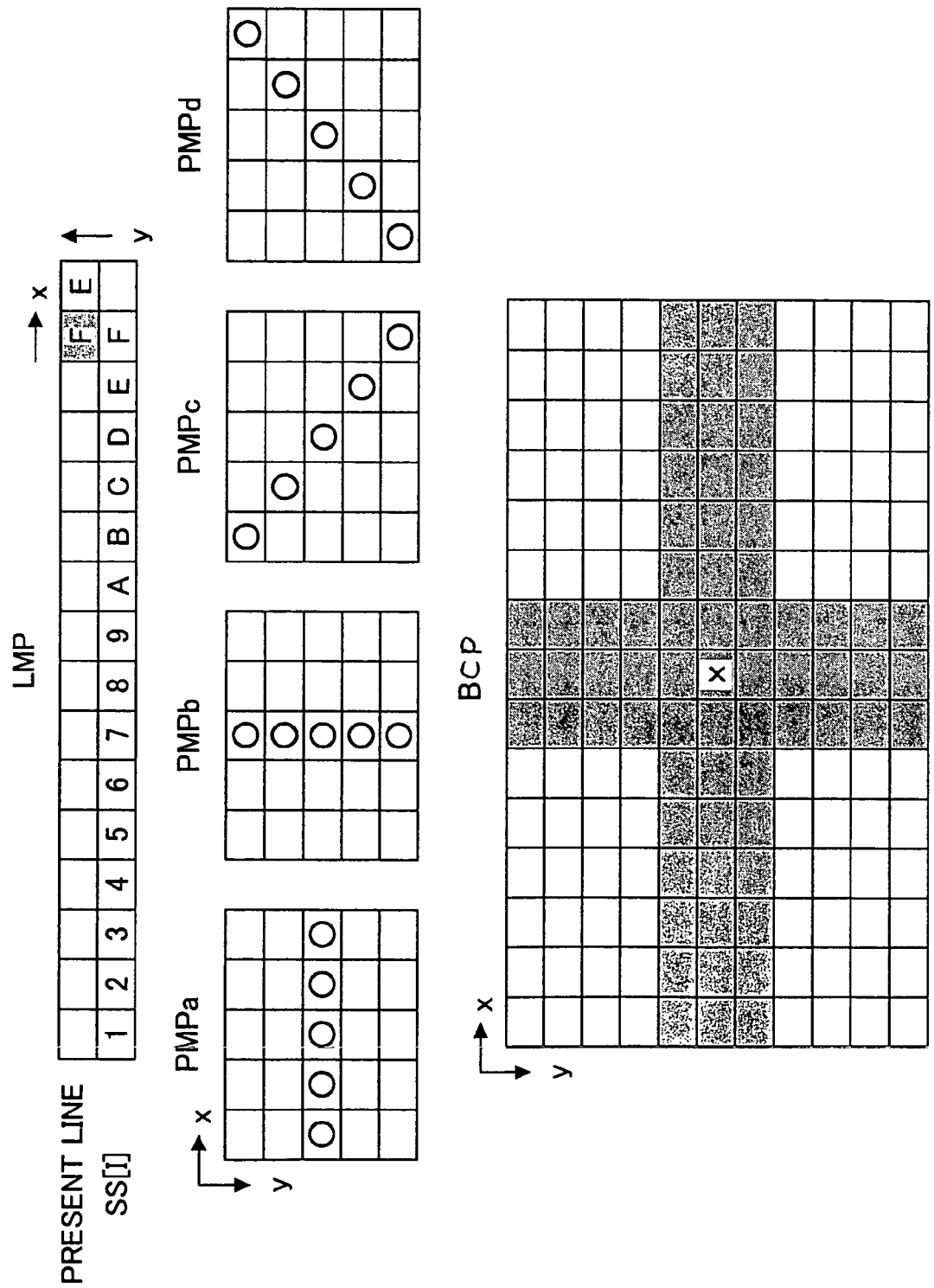

FOR 200 LINES

FOR 300 LINES

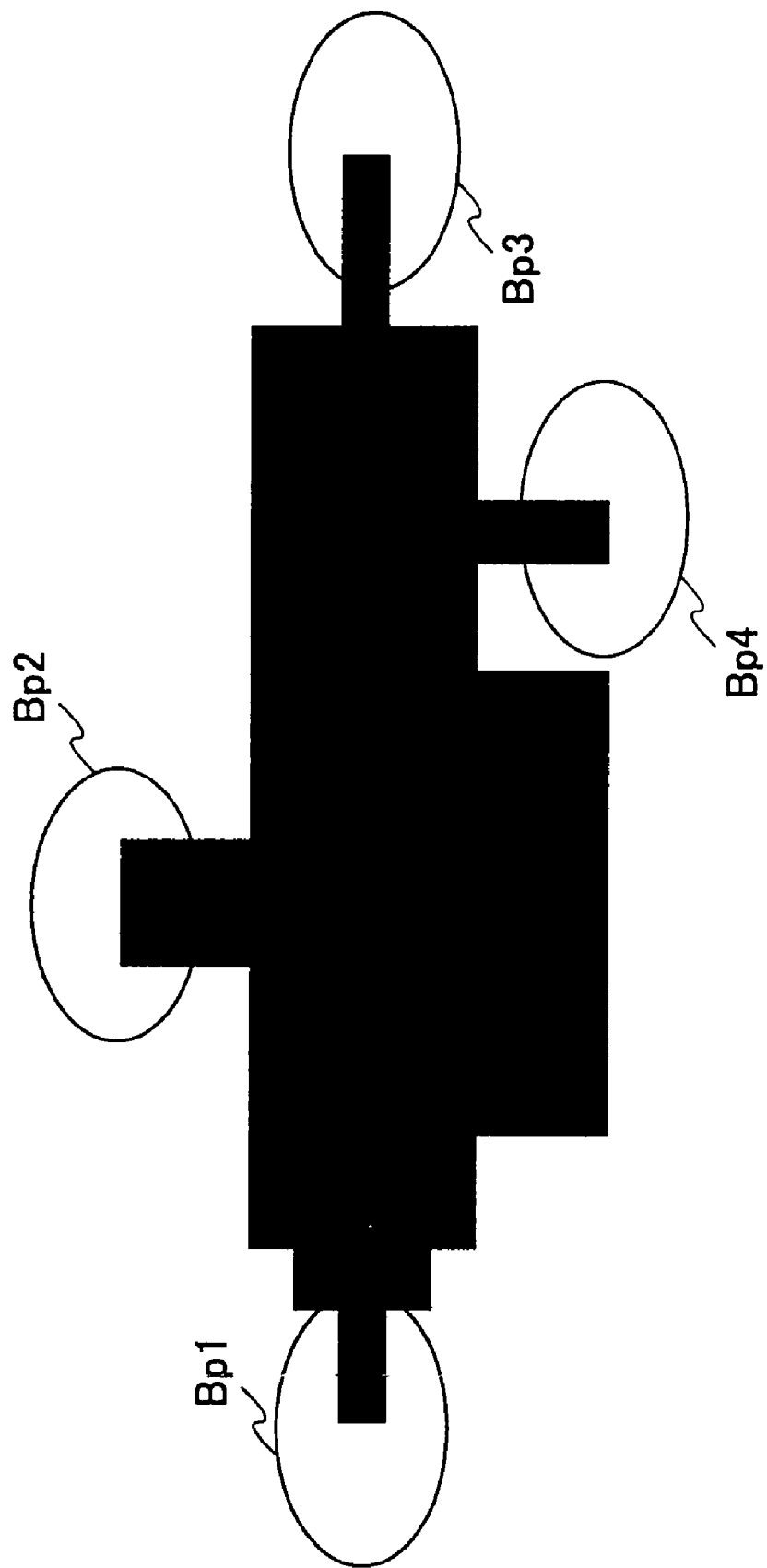

FIG.15
MPa
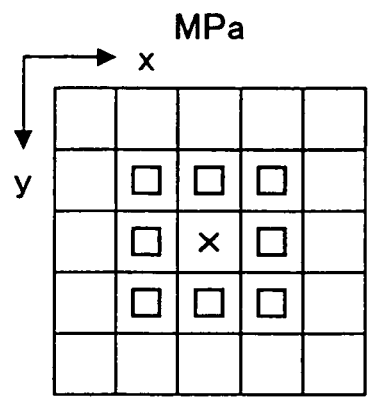
MPb
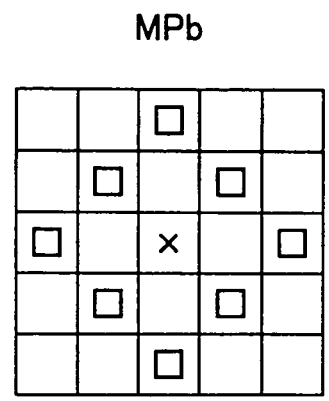
MPc
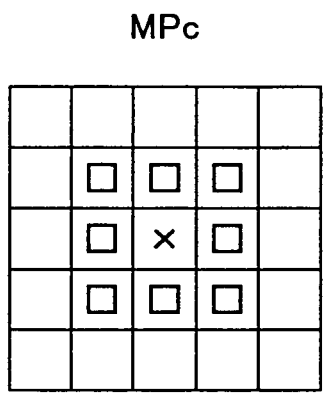
MPd
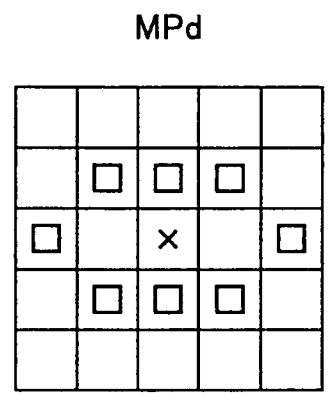
MPe
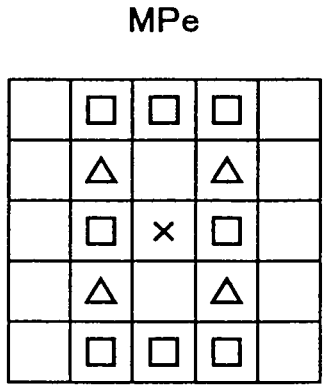
MPf
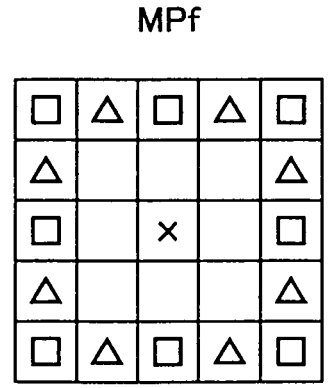
AMP
| S1 | S2 |
|----|----|
| S3 | S4 |

FIG.16A
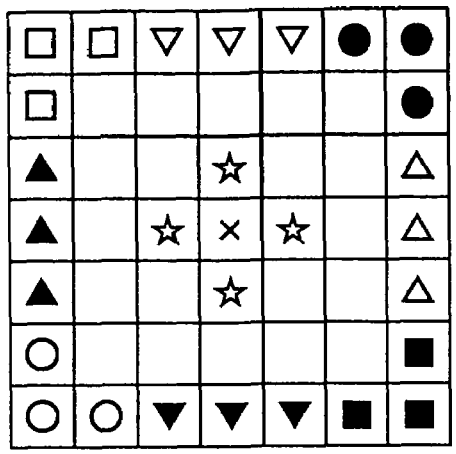
FIG.16B
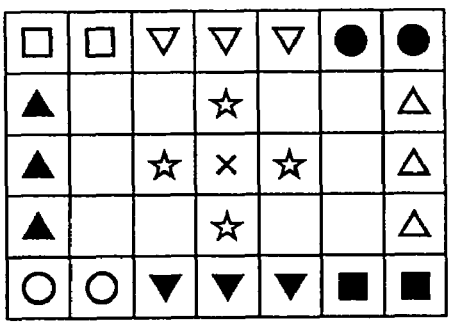
FIG.16C
| a1 | a2 | a3 | a4 | a5 | a6 | a7 |
|----|----|----|----|----|----|----|
| b1 | b2 | b3 | b4 | b5 | b6 | b7 |
| c1 | c2 | c3 | c4 | c5 | c6 | c7 |
| d1 | d2 | d3 | d4 | d5 | d6 | d7 |
| e1 | e2 | e3 | e4 | e5 | e6 | e7 |
| f1 | f2 | f3 | f4 | f5 | f6 | f7 |
| g1 | g2 | g3 | g4 | g5 | g6 | g7 |

DARK(BLACK)

LIGHT(WHITE)

DARK(BLACK)

LIGHT(WHITE)

FIG.19
pm1
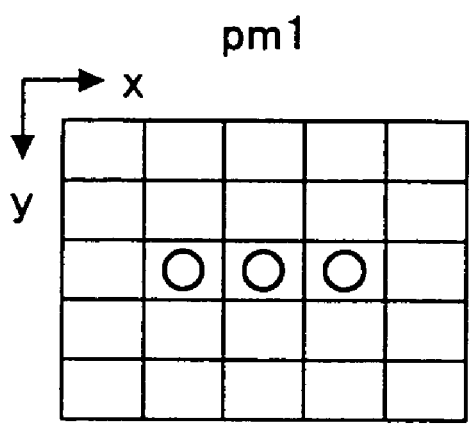
pm2
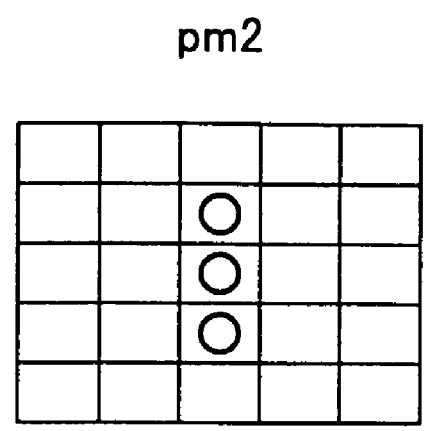
pm3
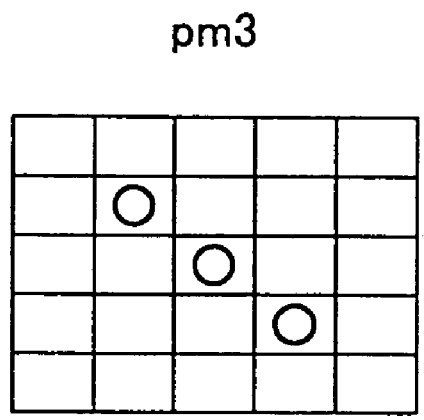
pm4
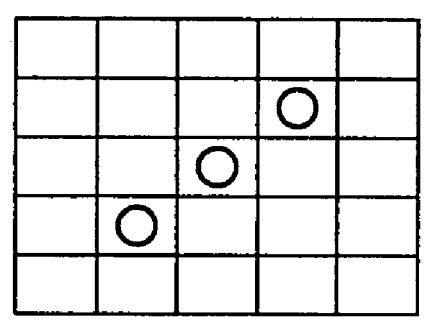

- : Y COMPONENT OF BLACK IN PHOTOGRAPH MODE
- : M COMPONENT OF BLACK IN PHOTOGRAPH MODE
- : C COMPONENT OF BLACK IN PHOTOGRAPH MODE
- : BK COMPONENT (GRAY) OF BLACK IN PHOTOGRAPH MODE
- : Bk COMPONENT (BLACK) OF BLACK IN PHOTOGRAPH MODE

IMAGE-PROCESSING DEVICE PROCESSING IMAGE DATA BY JUDGING A DETECTED AND EXPANDED MEDIUM-DENSITY FIELD AS A NON-CHARACTER EDGE FIELD

This application is a continuation application of application Ser. No. 10/152,627, filed May 23, 2002 now U.S. Pat. No. 7,139,100, which is hereby incorporated herein by reference in its entirety.

BACKGROUND OF THE INVENTION

1. Field of the Invention

The present invention generally relates to an image-processing device, and more particularly, to an image-processing device detecting a character in image data so as to apply a proper image processing thereto, an image-reading device comprising the image-processing device, an image-forming device comprising the image-processing device, and a color-copying device comprising the image-processing device.

2. Description of the Related Art

The invention disclosed in Japanese Laid-Open Patent Application No. 6-152945 is publicly known as a technology related to the above-referenced image-processing device. In this invention, a white ground is detected so that a character field with a small line width and a character field with a large line width are separately processed.

The invention disclosed in Japanese Laid-Open Patent Application No. 10-108012 is also publicly known. In this invention, a white ground is detected so that a field surrounded by the white ground is processed as a picture field.

However, switching the-image processing according to a line width yields an unnatural image at a line-width boundary at which the image processing is switched. For example, reading and printing a character having a low density of 0.7-1.0 results in an edge of the character being emphasized, and an outline of the character being fringed, which makes the character hard to see.

SUMMARY OF THE INVENTION

It is a general object of the present invention to provide an improved and useful image-processing device in which the above-mentioned problems are eliminated.

A more specific object of the present invention is to provide an image-processing device which prevents a switching of an image processing from yielding an unnatural image at a boundary at which the image processing is switched, and also to provide an image-reading device comprising the image-processing device, an image-forming device comprising the image-processing device, and a color-copying device comprising the image-processing device.

In order to achieve the above-mentioned objects, there is provided according to one aspect of the present invention an image-processing device applying a predetermined process to input image data so as to output the processed image data, the image-processing device comprising a medium-density detection unit detecting a medium-density field of an image represented by the image data, an expansion unit applying an expansion process to the medium-density field detected by the medium-density detection unit, and a non-character edge judgment unit judging the medium-density field applied with the expansion process by the expansion unit as a non-character edge field of the image represented by the image data.

According to the present invention, the field expanded by the expansion unit can be judged not as a character. Consequently, the image processing can be switched only at the medium-density field such that a high-density field of a line can be subjected to an identical image processing, regardless of a line width. Thereby, since a general print matter has a high density, an image of the print matter can be processed excellently, not as a picture field, but as a non-picture field, regardless of a line width. Accordingly, the image-processing device can prevent the switching of the image processing from yielding an unnatural image at a boundary at which the image processing is switched.

Additionally, in the image-processing device according to the present invention, the expansion unit may apply the expansion process after applying a contraction process to the medium-density field detected by the medium-density detection unit.

According to the present invention, the image-processing device can, not only exhibit the same advantage as described above, but also eliminate an isolated point.

Additionally, in the image-processing device according to the present invention, the medium-density detection unit may detect the medium-density field of the image represented by the image data by performing a pattern matching with respect to a multiple-line pattern.

According to the present invention, the image-processing device can surely judge a medium-density picture field as a picture field in a subject copy including a multiple-line pattern.

Additionally, the image-processing device according to the present invention may further comprise an edge detection unit detecting an edge of the image represented by the image data.

According to the present invention, a high-density line can be judged as a character regardless of a line width, and a medium-density line can be judged as a character only when the medium-density line is a fine line. Accordingly, a high-density character can be subjected to an identical image processing. Accordingly, since a general print matter has a high density, and thus a fine line in the print matter is judged unmatched in a pattern matching, only the fine line needs to be judged as a character, which facilitates the image processing.

In order to achieve the above-mentioned objects, there is also provided according to another aspect of the present invention an image-reading device comprising an image-reading unit (a color scanner) reading an image of a subject copy by performing a color separation to the image of the subject copy so as to generate image data, and the above-mentioned image-processing device as an unit applying the predetermined process to the image data supplied from the image-unit.

According to the present invention, the image-reading device can exhibit the same advantage as the above-mentioned image-processing device.

In order to achieve the above-mentioned objects, there is also provided according to another aspect of the present invention an image-forming device comprising the above-mentioned image-processing device as an unit thereof, and an image-outputting unit (a color printer) outputting the image by forming the image based on the processed image data output from the image-processing unit and transferring the formed image on a sheet.

According to the present invention, the image-forming device can exhibit the same advantage as the above-mentioned image-processing device.

In order to achieve the above-mentioned objects, there is also provided according to another aspect of the present invention a color-copying device comprising the above-mentioned image-reading unit (the color scanner), the above-mentioned image-processing device, and the above-mentioned image-outputting unit (the color printer).

According to the present invention, the color-copying device can exhibit the same advantage as the above-mentioned image-processing device.

Additionally, the color-copying device according to the present invention may further comprise a control unit (a printer controller) analyzing a print command supplied from an external apparatus so as to cause the image-outputting unit, (the color printer) to print out image information supplied from the external apparatus.

According to the present invention, the color-copying device can be used as a printer accommodating an external input, such as a network printer.

Other objects, features and advantages of the present invention will become more apparent from the following detailed description when read in conjunction with the accompanying drawings.

BRIEF DESCRIPTION OF THE DRAWINGS

FIG. 5 is an illustration showing a multiple-line pattern of 600 dpi and a multiple-line pattern of 400 dpi in comparison;

FIG. 8 includes examples of patterns used in a white background separation performed by an RGB white ground detection unit shown in FIG. 7 and pixel matrix distributions used in a valley-like white pixel performed by an RGB white extraction unit shown in FIG. 7;

FIG. 9 shows examples of patterns used in a color ground detection performed by a color pixel detection unit shown in FIG. 7;

FIG. 10 is a flowchart of processes updating state variables MS and SS[I] used in a white judgment;

FIG. 11 includes a symbolical diagram of a present line and a preceding line in a line memory LMP, and diagrams of continuity patterns PMPa to PMPd used in a white pattern matching and a block pattern BCP used in a white correction;

FIG. 13 illustrates a field referred to upon explaining a process of the white-field extraction unit shown in FIG. 7;

FIG. 15 includes illustrations used for explaining a detection process of a first dot-peak detection unit show in FIG. 14, and a process of the dot extraction unit shown in FIG. 14;

FIG. 16A to FIG. 16C are illustrations used for explaining a detection process of a third dot-peak detection unit shown in FIG. 14;

FIG. 19 shows patterns used in a pattern matching performed in the color-pixel judgment unit shown in FIG. 18;

DETAILED DESCRIPTION OF THE PREFERRED EMBODIMENTS

A description will now be given, with reference to the drawings, of an image-processing device according to the present invention.

<Digital Full-color Copying Machine>

Figure 1:
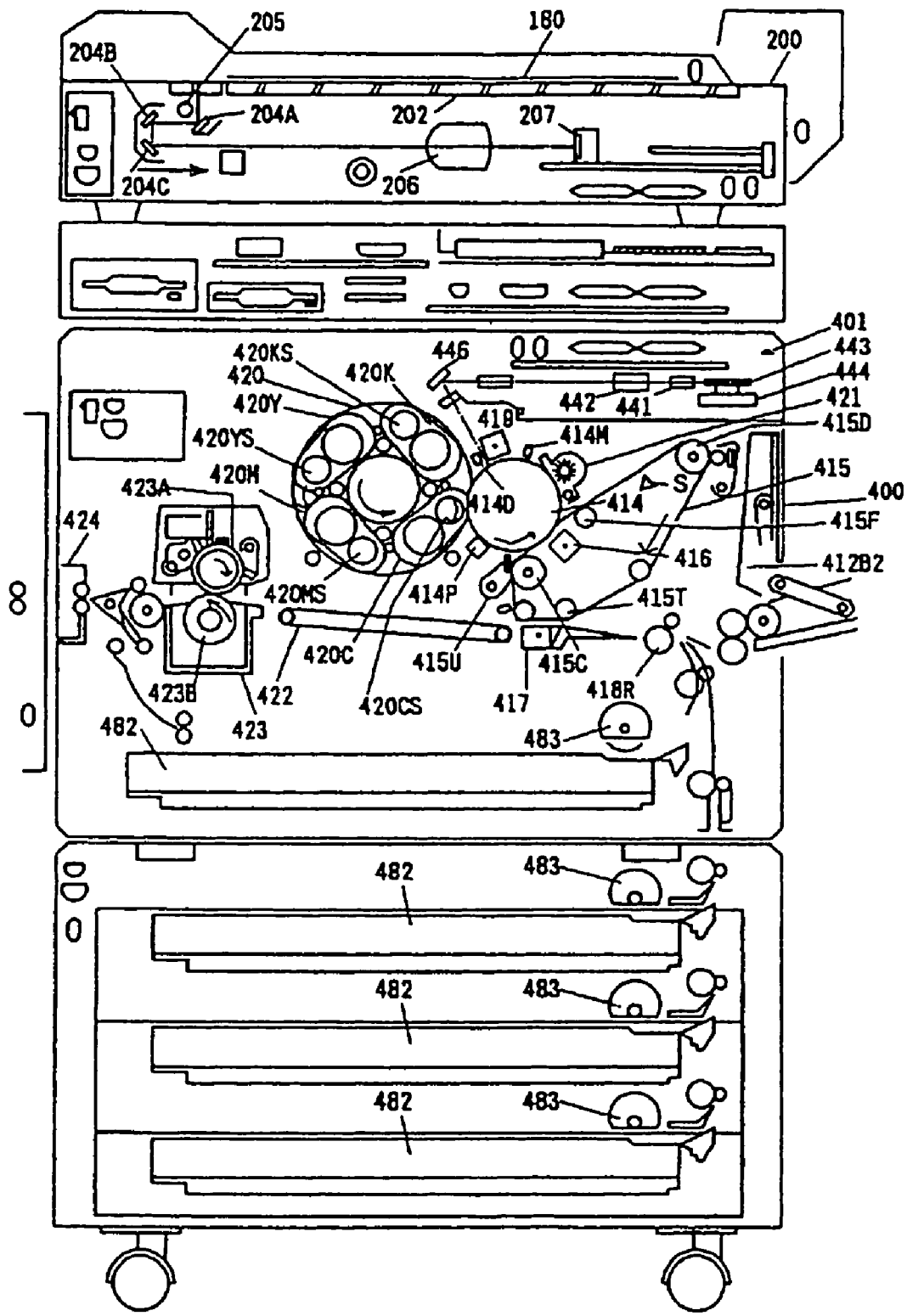
FIG. 1 is an illustration outlining a structure of a digital full-color copying machine comprising an image-processing device according to an embodiment of the present invention.

FIG. 1 is an illustration outlining a structure of a digital full-color copying machine comprising the image-processing device according to an embodiment of the present invention.

The digital full-color copying machine according to the present embodiment comprises a color-image reading device (hereinafter referred to as a scanner; an image-reading unit) 200 and a color-image recording device (hereinafter referred to as a color printer; an image-outputting unit) 400.

The scanner 200 forms an image of a subject copy 180 placed on a contact glass 202 on a color sensor 207 by means of a lighting lamp 205, a group of mirrors 204A, 204B and 204C, and a lens 206 so as to read color image information of the subject copy 180 on the basis of each of color separation lights of blue (hereinafter referred to as B), green (hereinafter referred to as G), and red (hereinafter referred to as R), for example, and to convert the color image information into electrical image signals. The color sensor 207 consists of a 3-line CCD sensor in this example, and reads an image of B, G and R on an individual color basis. Based on intensity levels of the color-separation image signals of B, G and R obtained by the scanner 200, a color converting process is performed in an image processing unit (shown in the FIG. 2) so as to obtain color image data including recording color information of black (hereinafter referred to as Bk), cyan (hereinafter referred to as C), magenta (hereinafter referred to as M), and yellow (hereinafter referred to as Y).

The color printer 400 uses this color image data so as to form an image of Bk, C, M and Y on an intermediate transfer belt such that the colors of Bk, C, M and Y overlap one another, and transfers the image on a transfer sheet. When the scanner 200 receives a scanner start signal timed with the operation of the color printer 400, a lighting/mirror optical system comprising the lighting lamp 205, the group of the mirrors 204A, 204B and 204C and so forth scans the subject copy 180 rightward as indicated by an arrow in FIG. 1 so as to obtain image data of one color upon each scanning. Upon each scanning, the color printer 400 develops the image data into an image, color by color, and lays the images over one another on the intermediate transfer belt so as to form a full-colored image of four colors.

A write optical unit 401 as an exposing means of the color printer 400 converts the color image data transferred from the color scanner 200 into an optical signal, and performs an optical writing corresponding to the image of the subject copy 180 so as to form an electrostatic latent image on a photosensitive drum 414. This write optical unit 401 comprises a laser emitter (a laser diode) 441, a light-emission drive control unit (not shown in the figure) driving the laser emitter 441 to emit a laser-light, a polygon mirror 443, a rotary motor 444 driving the polygon mirror 443 to revolve, a fθ lens 442, a reflective mirror 446, and other components. The photosensitive drum 414 revolves counterclockwise as indicated by a curved arrow in FIG. 1. Around the photosensitive drum 414 are arranged a photosensitive-drum cleaning unit 421, an electricity-eliminating lamp 414M, an electrifying device 419, a potential sensor 414D sensing a potential of the latent image formed on the photosensitive drum 414, a selected developing device of a revolver developing unit 420, a developed density pattern sensor 414P, an intermediate transfer belt 415, and other components.

The revolver developing unit 420 comprises a Bk developing device 420K, a C developing device 420C, an M developing device 420M, a Y developing device 420Y, a revolver driving unit (not shown in the figure) revolving each of the developing devices counterclockwise as indicated by another curved arrow in FIG. 1, and other components. Each of the developing devices 420K, 420C, 420M and 420Y comprises a developing sleeve 420KS, 420CS, 420MS or 420YS, a developer paddle and other components. Each of the developing sleeves 420KS, 420CS, 420MS and 420YS brings a crest of a developer into contact with a surface of the photosensitive drum 414 and revolves so as to develop the electrostatic latent image. The developer paddle revolves so as to scoop up and stir the developer. In a stand-by state of the digital full-color copying machine, the revolver developing unit 420 is positioned at a development position of the Bk developing device 420K at which the Bk developing device 420K develops the electrostatic latent image. Upon commencing a copying operation, the color scanner 200 starts reading Bk image data according to a predetermined timing. Based on this image data, the optical writing and the formation of the electrostatic latent image by means of the laser light commence. Hereinbelow, an electrostatic latent image based on the Bk image data is referred to as a Bk latent image. Similarly, an electrostatic latent image based on C, M or Y image data is also referred to as C, M or Y latent image. For the purpose of enabling the Bk latent image to be developed from a front end thereof, the developing sleeve 420KS starts being revolved before the front end of the Bk latent image reaches the development position of the Bk developing device 420K, then the developing sleeve 420KS develops the Bk latent image by using a Bk toner. This operation of developing the Bk latent image area is continued until a tail end of the Bk latent image passes the development position of the Bk developing device 420K. When the tail end of the Bk latent image passes the development position of the Bk developing device 420K, the revolver developing unit 420 is immediately driven to revolve from the development position of the Bk developing device 420K to a development position of the next-color developing device. This revolution is completed at least before a front end of the latent image based on the next-color image data reaches the development position of the next-color developing device.

When this image-forming cycle is started, the photosensitive drum 414 is revolved counterclockwise as indicated by the curved arrow in FIG. 1, and the intermediate transfer belt 415 is revolved clockwise by a driving motor (not shown in the figure). As the intermediate transfer belt 415 revolves, a Bk toner image, a C toner image, an M toner image and a Y toner image are formed successively such that the toner images eventually over lap one another on the intermediate transfer belt 415 in the order of Bk, C, M and Y. The Bk image is formed as follows. The electrifying device 419 electrifies the photosensitive drum 414 uniformly at approximately −700 V with a negative charge by performing a corona discharge. Subsequently, the laser diode 441 performs a raster exposure according to a Bk signal. When a raster image is thus exposed, an exposed part of the photosensitive drum 414 initially electrified uniformly loses a charge in proportion to a luminous energy of the exposure so that the electrostatic latent image is formed. The toner in the revolver developing unit 420 is negatively electrified by being agitated with a ferrite carrier. Additionally, the developing sleeve 420KS of the present developing unit is biased with respect to a metallic substratum of the photosensitive drum 414 by a power supply circuit (not shown in the figure) at a potential obtained by a superimposition of a negative direct current potential and an alternating current. Consequently, whereas no toner adheres to a part of the photosensitive drum 414 retaining a charge, the Bk toner adheres to the exposed part, i.e., the discharged part, of the photosensitive drum 414 so as to form a Bk visible image similar to the latent image. The intermediate transfer belt 415 is stretched on a driving roller 415D, a transfer facing roller 415T, a cleaning facing roller 415C, and driven rollers 415F. The intermediate transfer belt 415 is revolved by the driving motor (not shown in the figure). The Bk toner image formed on the photosensitive drum 414 is transferred by a belt-transfer corona discharger 416 (hereinafter referred to as a belt transfer unit 416) to a surface of the intermediate transfer belt 415 driving at a constant velocity in contact with the photosensitive drum 414. Hereinbelow, a transfer of a toner image from the photosensitive drum 414 to the intermediate transfer belt 415 is referred to as belt transfer. A slight amount of a residual toner remaining on the photosensitive drum 414 after the belt transfer is cleaned by the photosensitive-drum cleaning unit 421 in preparation for a next use of the photosensitive drum 414. The toner collected in this cleaning is accumulated in a waste toner tank via a collection pipe (not shown in the figure).

Besides, the toner images of Bk, C, M and Y formed in succession on the photosensitive drum 414 are registered in succession on a same surface of the intermediate transfer belt 415 so as to form a belt transfer image of the four overlapping colors. Thereafter, the belt transfer image of the four overlapping colors is transferred to the transfer sheet at one time by a corona-discharge transferer. By the way, on the photosensitive drum 414, a step of forming the C image starts after the step of forming the Bk image. The scanner 200 starts reading C image data according to a predetermined timing, and the C latent image is formed by a laser optical writing based on the C image data. Then, after the tail end of the Bk latent image passes a development position of the C developing device 420C, and before a front end of the C latent image reaches the development position, the revolver developing unit 420 is revolved so that the C developing device 420C develops the C latent image by using a C toner. This operation of developing the C latent image area is continued until a tail end of the C latent image passes the development position. As in the above-described case of the Bk developing device, when the tail end of the C latent image passes the development position, the revolver developing unit 420 is driven to revolve so as to send out the C developing device 420C and brings the next M developing device 420M to a development position thereof. This revolution is completed at least before a front end of the next M latent image reaches the development position. Steps of forming the M and Y images include substantially the same operations of reading the respective image data, forming the latent image, and developing the latent image as the above-described steps of forming the Bk and C images, and therefore will not be described herein.

A belt cleaning device 415U comprises an entrance seal, a rubber blade, an ejection coil, and mechanisms contacting and departing the entrance seal and the rubber blade. During the belt transfers of the second, third and fourth-color C, M and Y images after the belt transfer of the first-color Bk image, the entrance seal and the rubber blade are cleared from the surface of the intermediate transfer belt 415 by the above-mentioned mechanisms.

A sheet-transfer corona discharger 417 (hereinafter referred to as a sheet transferer 417) applies an AC+DC component or a DC component to the transfer sheet and the intermediate transfer belt 415 by a corona-discharge method so as to transfer the overlapping toner images formed on the intermediate transfer belt 415 to the transfer sheet.

Transfer-sheet cassettes 482 located in a feeding bunk contain transfer sheets of various sizes. A transfer sheet is fed and conveyed by a feeding roller 483 from one of the transfer-sheet cassettes 482 containing transfer sheets of a designated size toward a pair of resist rollers 418R. Besides, a manual-feeding tray 412B2 is used for manually feeding an OHP sheet or a paperboard, etc. Upon starting the above-described image formation, the transfer sheet is fed from either of the transfer-sheet cassettes 482 or the manual-feeding tray 412B2, and stands by at a nip part of the pair of the resist rollers 418R. Then, when a front end of the toner image formed on the intermediate transfer belt 415 reaches the sheet transferer 417, the pair of the resist rollers 418R are driven so that a front end of the transfer sheet coincides exactly with the front end of the toner image; thus, the sheet and the image are matched. Accordingly, the transfer sheet is laid over the image of the overlapping colors formed on the intermediate transfer belt 415, and is passed over the sheet transferer 417 connected to a positive potential. At this point, the transfer sheet is charged with a positive charge by a corona-discharge current so that substantially all part of the toner image is transferred to the transfer sheet. Subsequently, when the transfer sheet passes an electricity-eliminating separator formed by an electricity-eliminating brush (not shown in the figure) located at the left of the sheet transferer 417, the transfer sheet is rid of electricity so as to be separated from the intermediate transfer belt 415 to a sheet conveying belt 422. The transfer sheet receiving the toner image of the four overlapping colors at one time from the surface of the intermediate transfer belt 415 is conveyed to a fixer 423 by the sheet conveying belt 422, in which the toner image is fixed on the transfer sheet by being fused at a nip part between a fixing roller 423A and a pressing roller 423B controlled at a predetermined temperature. Then, the transfer sheet is sent out of the digital full-color copying machine by a pair of delivering rollers 424, and is stacked on a copy tray (not shown in the figure) with a front surface of the transfer sheet facing upward.

Besides, the surface of the photosensitive drum 414 after the belt transfer is cleaned by the photosensitive-drum cleaning unit 421 consisting of a brushing roller, a rubber blade and so forth, and is uniformly rid of electricity by the electricity-eliminating lamp 414M. In addition, the surface of the intermediate transfer belt 415 after the transfer of the toner image to the transfer sheet is again cleaned by the rubber blade of the belt cleaning device 415U being pressed thereagainst by the mechanism contacting and departing the rubber blade of the belt cleaning device 415U. In a case of a repeating copy, with respect to the operation of the scanner 200 and the image formation on the photosensitive drum 414, a step of forming an image of the first color (Bk) for a second subject copy is performed after the step of forming the image of the fourth color (Y) for the first subject copy, according to a predetermined timing. With respect to the intermediate transfer belt 415, after the step of transferring the image of the four overlapping colors of the first subject copy to the transfer sheet at one time, a belt transfer is performed so that a Bk toner image of the second subject copy is transferred to an area on the surface of the intermediate transfer belt 415 cleaned by the belt cleaning device 415U. Thereafter, the same operations as for the first subject copy are performed.

The digital full-color copying machine shown in FIG. 1 is a multifunctional color copying machine that can cause the color printer 400 to print out (an image of) print data provided from a host, such as a personal computer, via a LAN or a parallel I/F, that can transmit image data read by the scanner 200 to a distant facsimile apparatus, and that can also print out image data received from a distant facsimile apparatus. This copying machine is connected to a public telephone network via a private branch exchange (PBX) so as to communicate with such a facsimile apparatus and an administrative server of a service center.

<Electric System>
<<Outline>>

Figure 2:
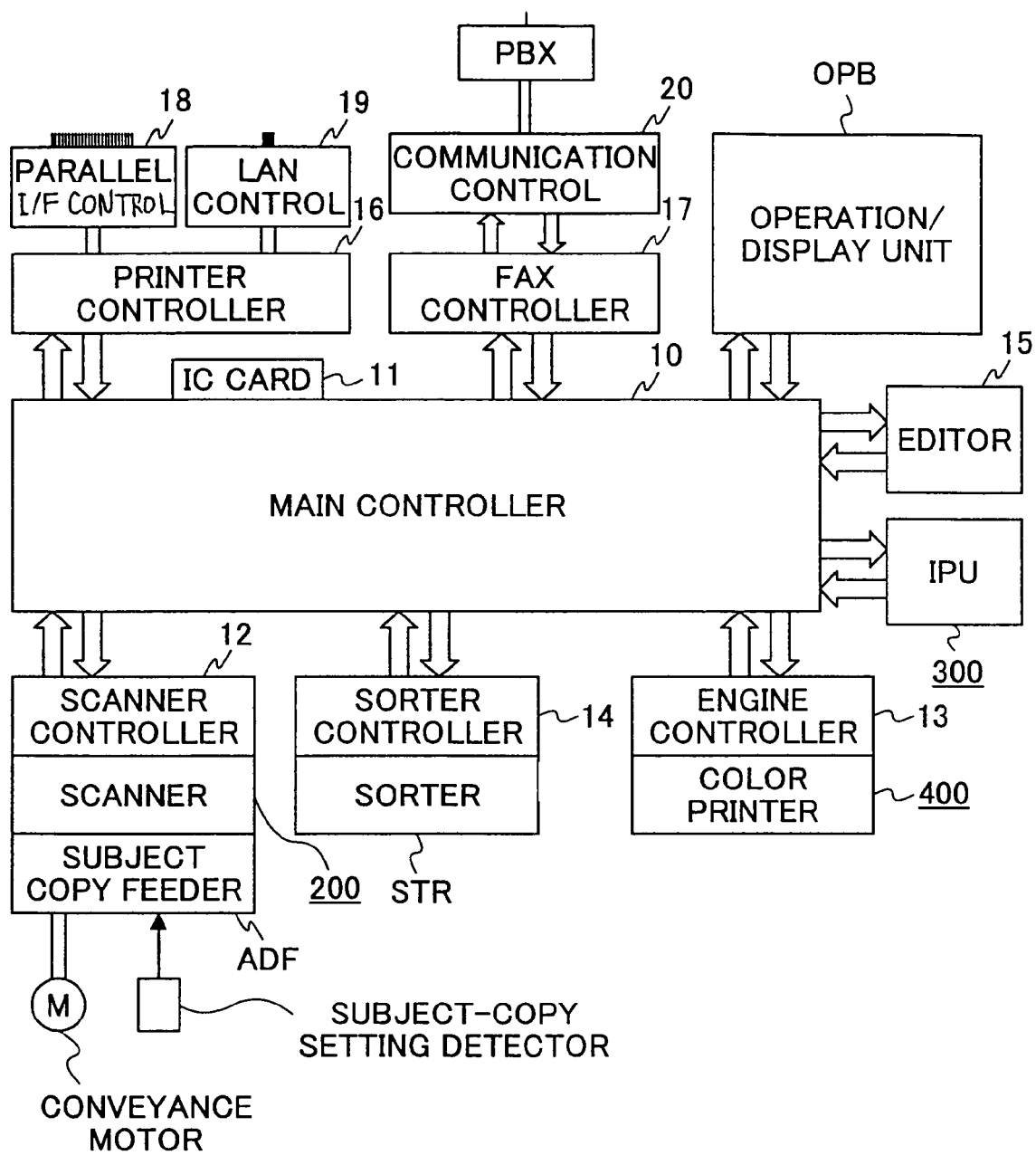
FIG. 2 is a block diagram illustrating an outline of an electric system of the digital full-color copying machine shown in FIG. 1.

FIG. 2 is a diagram illustrating an outline of an electric system of the digital full-color copying machine shown in FIG. 1. Specifically, FIG. 2 illustrates a control device of the digital full-color copying machine, with a main controller 10 at the center thereof. The main controller 10 controls the digital full-color copying machine as a whole. The main controller 10 is connected with distributed control devices, such as an operation/display board OPB, an editor 15, a scanner controller 12, a printer controller (a control unit) 16, a fax controller 17, an image-processing unit (IPU) 300, and an engine controller 13. The operation/display board OPB displays various messages and so forth for an operator, and controls input of function settings provided from an operator. The scanner controller 12 controls the scanner 200 and an optional ADF, controls a writing of a subject-copy image to an image memory, and controls a formation of an image from the image memory, and so forth. The engine controller 13 is provided in the color printer 400, and controls image-forming engines performing operations of charging, exposing, developing, sheet-feeding, transferring, fixing, and sheet-conveying. Each of the distributed control devices and the main controller 10 exchange information concerning a mechanical status and an operational command, as occasion demands. Additionally, a main motor and various clutches necessary for conveying a sheet are connected to a driver (not shown in the figure) provided in the main controller 10. Besides, the main controller 10 is connectable with an IC card 11 and a sorter controller 14. The IC card 11 is used for managing numbers of copies on an individual department basis, for example.

The color printer 400 includes electric circuits and control circuits driving mechanical elements performing operations of feeding a sheet from the feeding cassettes or the feeding tray, charging the photosensitive drum 414, exposing an image by the (laser) write optical unit 401, developing the image, transferring the image, fixing the image, and delivering the sheet, and also includes various sensors.

The printer controller 16 analyzes and bitmaps an image and a print command supplied from an external apparatus, such as a personal computer, into printable image data, and drives the color printer 400 via the main controller 10 so as to print out the image data. The printer controller 16 is provided with a LAN control 19 and a parallel I/F control 18 so as to receive the image and the command via the LAN and the parallel I/F.

Upon receiving a command requesting a facsimile transmission, the fax controller 17 drives the scanner 200 and the IPU 300 via the main controller 10 so as to read an image of a subject copy and send out the image data to a facsimile communication line via a communication control 20 and a PBX. Upon receiving a facsimile call from the communication line and receiving image data, the fax controller 17 drives the color printer 400 via the main controller 10 so as to print out the image data.

Figure 3:
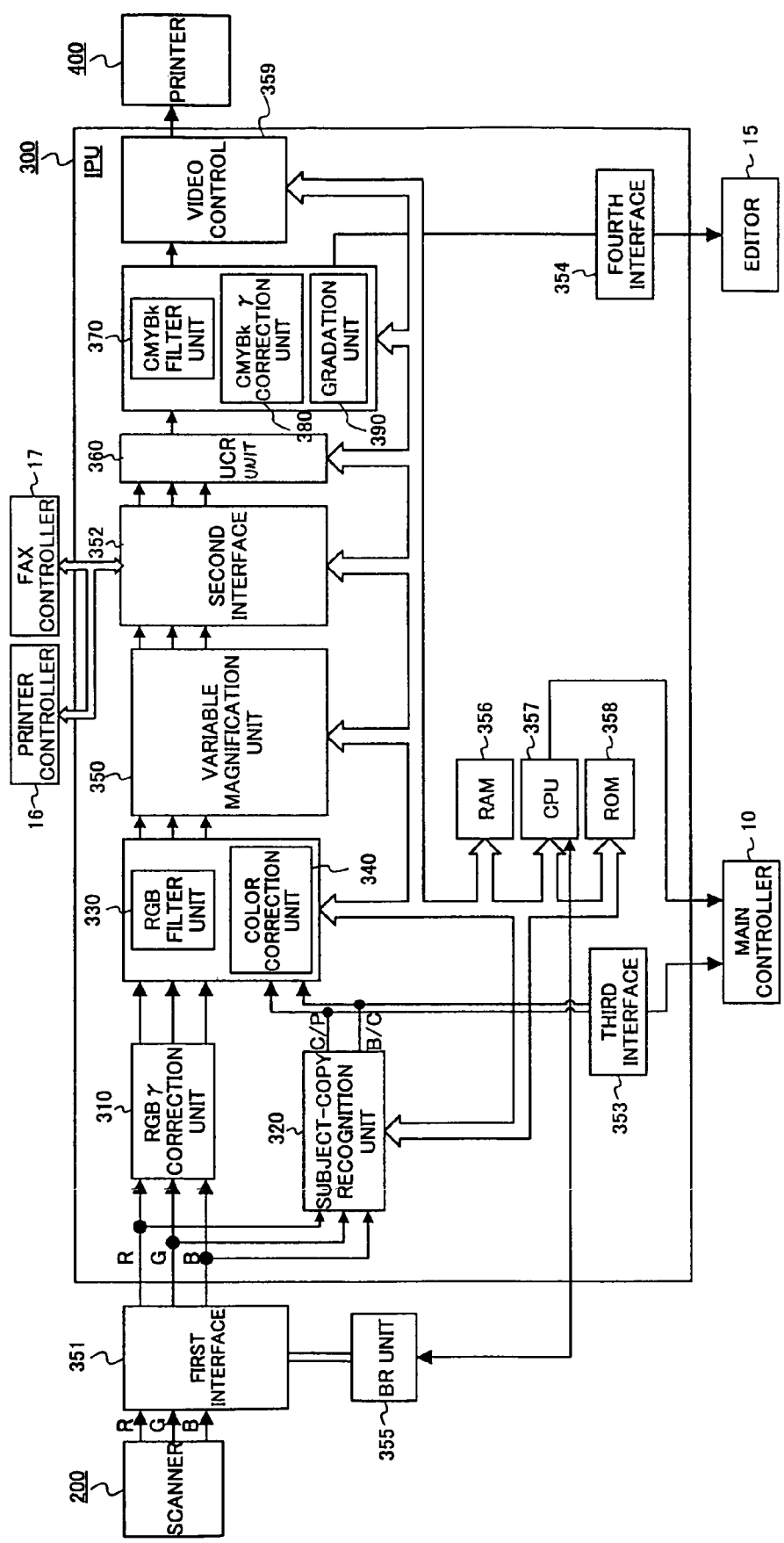
FIG. 3 is a block diagram illustrating a structure of an image-processing unit (IPU) shown in FIG. 2.

FIG. 3 is a diagram illustrating a structure of the image-processing unit (IPU) 300. In FIG. 3, image data of R, G and B output from the scanner 200 is supplied to the IPU 300 via a first interface 351. Besides, a BR unit 355 orders a monochromatic recording using only B or R, the image data of R, G and B undergoes selection and collection for the monochromatic recording; however, this monochromatic recording mode will not be described further herein. The image data of R, G and B supplied to the IPU 300 is converted from reflectance data (of R, G and B) to density data (of R, G and B) by an RGB γ correction unit 310.

Based on this density data of R, G and B, a subject-copy recognition unit 320 judges which of a character field (of a character or a lineal drawing) and a picture field (of a picture or a photograph; a non-character field) the density data of R, G and B is addressed to; thereupon, the subject-copy recognition unit 320 supplies a C/P signal and a B/C signal to an RGB filter unit 330, and to the main controller 10 via a third interface 353.

Herein, the C/P signal is a 1-bit signal:
1 represents a character edge field; and
0 represents a picture field.
Also, the B/C signal is a 1-bit signal:
H ("1") represents an achromatic (blank) field; and
L ("0") represents a chromatic (color) field.
<<Subject-copy Recognition Unit 320 (FIG. 4)>>

Figure 4:
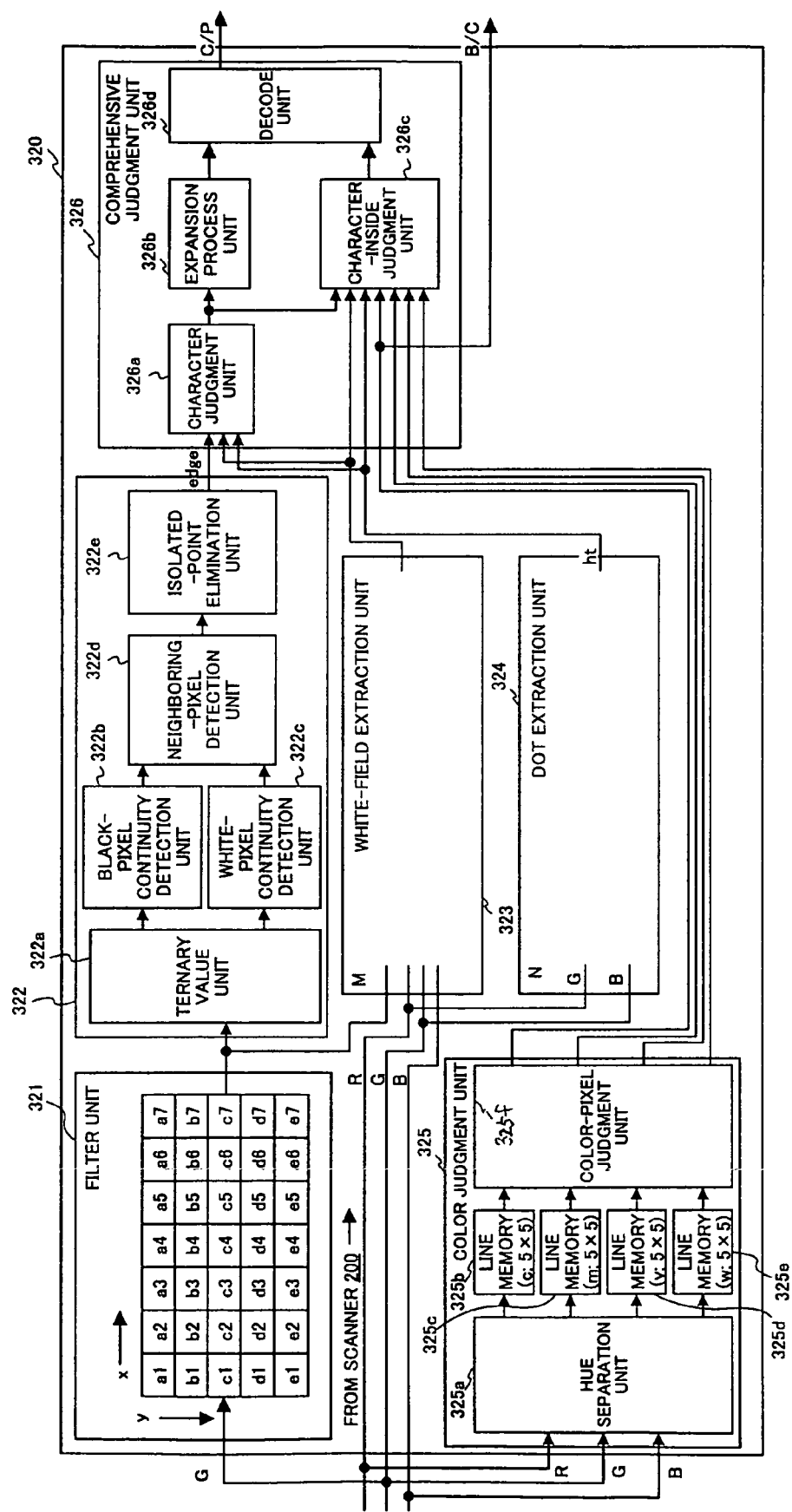
FIG. 4 is a functional block diagram illustrating a structure of a subject-copy recognition unit shown in FIG. 3.

FIG. 4 is a block diagram illustrating functions of the subject-copy recognition unit 320. The subject-copy recognition unit 320 performs the character edge detection, the picture detection, and the blank/color detection so as to generate the C/P signal representing a character edge field or a picture field, and the B/C signal representing an achromatic (blank) field or a chromatic (color) field.

The subject-copy recognition unit 320 mainly comprises a filter unit 321, an edge extraction unit (an edge detection unit) 322, a white-field extraction unit 323, a dot extraction unit 324, a color judgment unit 325, and a comprehensive judgment unit 326. It is noted that, in the present description, a reading density of the scanner 200 is approximately 600 dpi, for example.

<<Filter Unit 321>>

The filter unit 321 corrects the image data of G generated by the scanner 200 mainly for the purpose of extracting an edge of a character. At this point, since data read by the scanner 200 is sometimes blurred depending on a capability of the lens, the data is subjected to an edge emphasizing filter; however, the edge emphasizing filter needs to be so applied as to emphasize edges of a subject copy per se without emphasizing a multiple-line pattern widely used in copying machines for expressing gradations. If the multiple-line pattern is emphasized, a picture (a field gradated by the multiple-line pattern) may possibly be extracted as edges so as to eventually be misjudged as character edges; therefore, the multiple-line pattern should not be emphasized. Additionally, as shown in FIG. 5, a multiple-line pattern A of 600 dpi and a multiple-line pattern B of 400 dpi have different recurring cycles; therefore, when using a same filter coefficient, it is difficult not to emphasize the multiple-line patterns A and B. Thereupon, cycles of image patterns are detected so as to switch filter coefficients. Besides, in FIG. 5, a sum of a width of white block(s) in a main scanning direction x and a width of a black block adjacent thereto is a multiple-line pitch (a constant width: a predetermined number of pixels), i.e., a multiple-line cycle. In a low-density halftone, the width of white block(s) becomes larger, and the width of a black block becomes relatively smaller. In a higher-density halftone, the width of white block(s) becomes smaller, and the width of a black block becomes relatively larger.

In the present embodiment, a pixel matrix of the filter unit 321 contains seven pixels in a main scanning direction x times five pixels in a sub scanning direction y (a direction in which the scanner 200 mechanically scans a subject copy). The pixel matrix of the filter unit 321 is associated with two coefficient groups (coefficient matrixes) A and B containing respective weighted coefficients a1 to a7, b1 to b7, c1 to c7, d1 to d7 and e1 to e7 assigned to each of the pixels, as shown in a block of the filter unit 321 shown in FIG. 4. The following coefficient group A is used for a filtering process that suppresses an emphasis of the multiple-line pattern A of 600 dpi shown in FIG. 5, and emphasizes an edge of a character. The following coefficient group B is used for a filtering process that suppresses an emphasis of the multiple-line pattern B of 400 dpi shown in FIG. 5, and emphasizes an edge of a character.

| [Coefficient group A] | | | | | | |
|---|---|---|---|---|---|---|
| 0 | −1 | 0 | −2 | 0 | −1 | 0 |
| 0 | −1 | 0 | −2 | 0 | −1 | 0 |
| 0 | −1 | −1 | 20 | −1 | −1 | 0 |
| 0 | −1 | 0 | −2 | 0 | −1 | 0 |
| 0 | −1 | 0 | −2 | 0 | −1 | 0 |
| [Coefficient group B] | | | | | | |
| −1 | 0 | 0 | −2 | 0 | 0 | −1 |
| −1 | 0 | 0 | −2 | 0 | 0 | −1 |
| −1 | 0 | −1 | 20 | −1 | 0 | −1 |
| −1 | 0 | 0 | −2 | 0 | 0 | −1 |
| −1 | 0 | 0 | −2 | 0 | 0 | −1 |

In the foregoing coefficient groups A and B, transverse rows correspond to the main scanning direction x, and vertical columns correspond to the sub scanning direction y. In each of the foregoing coefficient groups A and B, coefficients in a first transverse row correspond to the coefficients a1 to a7 in a first row of the coefficient matrix shown in the block of the filter unit 321 in FIG. 4. A coefficient "20" at the center of a third transverse row in each of the foregoing coefficient groups A and B corresponds to coefficient of a pixel at the center of the coefficients c1 to c7 in a third row of the coefficient matrix shown in the block of the filter unit 321 in FIG. 4, i.e., the coefficient c4 of a present pixel. A sum of products (7 times 5 totaling 35 products) obtained by multiplying each of the coefficients in the coefficient matrix by a value represented by image data of a pixel assigned with the coefficient is supplied to the edge extraction unit 322 and the white-field extraction unit 323 as a value of image data of the present pixel (the pixel assigned with the coefficient c4) processed in the filter unit 321. Herein, the present pixel means a pixel being processed at present, which transits to another pixel successively in the direction x and the direction y.

In the coefficient group A, negative coefficients (small coefficients) are distributed at the multiple-line pitch of the multiple-line pattern A of 600 dpi shown in FIG. 5, and zeros (relatively large coefficients) are distributed therebetween, with 20 (a considerably large coefficient) being assigned to the present pixel for emphasizing an edge. Accordingly, when the image data (the present pixel) corresponds to an edge between black and white in a field of the multiple-line pattern A, a weighted average value (a sum of products) derived therefor becomes considerably low, compared to a character edge different from the multiple-line pattern A.

In the coefficient group B, negative coefficients (small coefficients) are distributed at the multiple-line pitch of the multiple-line pattern B of 400 dpi shown in FIG. 5, and zeros (relatively large coefficients) are distributed therebetween, with 20 (a considerably large coefficient) being assigned to the present pixel for emphasizing an edge. Accordingly, when the image data (the present pixel) corresponds to an edge between black and white in a field of the multiple-line pattern B, a weighted average value (a sum of products) derived therefor becomes considerably low, compared to a character edge different from the multiple-line pattern B.

Besides, the filter unit 321 performs the filtering process using the coefficient group B when either of the following conditions 1 and 2 stands, i.e., when the present pixel is likely to correspond to the multiple-line pattern B of 400 dpi shown in FIG. 5; otherwise, the filter unit 321 performs the filtering process using the coefficient group A.

[Condition 1]—Condition for detecting a light-colored part (a white block shown in FIG. 5) of the multiple-line pattern B of 400 dpi—
(D[3][1]<D[3][2]) &
(D[3][7]<D[3][6]) &
(ABS (D[3][2]-D[3][4])
>(ABS(D[3][4]-D[3][1])) &
(ABS (D[3][6]-D[3][4])
>(ABS(D[3][4]-D[3][7]))

[Condition 2]—Condition for detecting a dark-colored part (a black block shown in FIG. 5) of the multiple-line pattern B of 400 dpi—
(D[3][1]>D[3][2]) &
(D[3][7]>D[3][6]) &
(ABS (D[3][2]-D[3][4])
>(ABS(D[3][4]-D[3][1]))&
(ABS(D[3][6]-D[3][4])
>(ABS(D[3][4]-D[3][7]))

It is noted that D[i][j] means a value represented by image data of a pixel at a position located by x=i and y=j in the pixel matrix of the xy distribution. For example, D[3][1] is a value represented by image data of a pixel assigned with the coefficient a3 of the coefficient matrix shown in the block of the filter unit 321 in FIG. 4. "&" means a "logical product: AND". "ABS" means an absolute-value operator. The present pixel corresponds to D[4][3].

When either of the following conditions 1 and 2 stands, the present pixel is considered to belong to a field of the multiple-line pattern B of 400 dpi read at 600 dpi shown in FIG. 5 so as to perform the filtering process for emphasizing a character edge by using the coefficient group B. When neither of the following conditions 1 and 2 stands, the filtering process for emphasizing a character edge is performed by using the coefficient group A that avoids an emphasis of the multiple-line pattern A of 600 dpi read at 600 dpi shown in FIG. 5. That is, image cycles (pitches) are detected so as not to emphasize image patterns recurring at a particular cycle. Accordingly, edges of a character can be emphasized without emphasizing a multiple-line pattern. It is noted that, although FIG. 4 shows an example of using the image data of G for the edging process, other data, such as brightness data, may be used in place of the image data of G. That is, a signal representing light/dark properties is applicable thereto.

<Edge Extraction>

<<Edge Extraction Unit 322>>

A character field includes a multitude of pixels of a high-level density and pixels of a low-level density (hereinafter referred to as black pixels and white pixels, respectively). Additionally, in an edge part of the character field, the black pixels and the white pixels appear continuously. The edge extraction unit 322 detects a character edge according to continuity of the black pixels and the white pixels.

<<Ternary Value Unit 322a>>

First, a ternary value unit 322a converts the image data of G into a ternary value by using two threshold values TH1 and TH2, the image data of G (input data of the edge extraction unit 322) having undergone the filtering process for emphasizing a character edge performed by the filter unit 321. The threshold values TH1 and TH2 are set at 20 and 80, respectively, for example, when image data represents 256 gradations ranging from 0 to 255 (0=white).

When input data<TH1, the ternary value unit 322a converts the input data into ternary data representing a pixel corresponding to the input data as a white pixel.

When TH1≦input data<TH2, the ternary value unit 322a converts the input data into ternary data representing the pixel corresponding to the input data as a middle-tone pixel.

When TH2≦input data, the ternary value unit 322a converts the input data into ternary data representing the pixel corresponding to the input data as a black pixel.

<<Black-pixel Continuity Detection Unit 322b, White-pixel Continuity Detection Unit 322c>>

Figure 6:
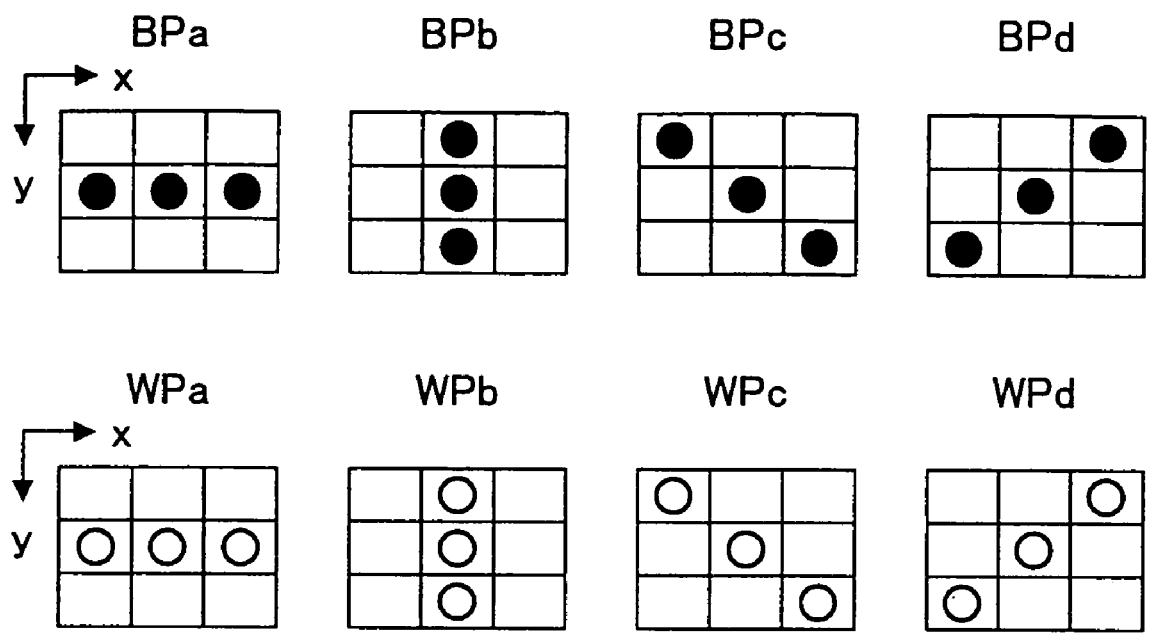
FIG. 6 shows patterns of 3×3 pixel matrixes used in pattern matching processes performed by a black-pixel continuity detection unit and a white-pixel continuity detection unit shown in FIG. 4.

Based on the ternary data, a black-pixel continuity detection unit 322b and a white-pixel continuity detection unit 322c detect a part of continuous black pixels and a part of continuous white pixels, respectively, by respective pattern matching processes. In the present embodiment, black-pixel distribution patterns BPa to BPd and white-pixel distribution patterns WPa to WPd of 3×3 pixel matrixes shown in FIG. 6 are used for the above-mentioned pattern matching processes. In the patterns shown in FIG. 6, a black circle indicates a black pixel, and a white circle indicates a white pixel. A blank pixel without either of the circles indicates whichever of a black pixel, a middle-tone pixel and a white pixel. A central pixel in each of the 3×3 pixel matrixes is a present pixel.

When a distribution of the ternary data matches either of the black-pixel distribution patterns BPa to BPd shown in FIG. 6, the black-pixel continuity detection unit 322b provides a present pixel with data representing the present pixel as one of "continuous black pixels". Similarly, when a distribution of the ternary data matches either of the white-pixel distribution patterns WPa to WPd shown in FIG. 6, the white-pixel continuity detection unit 322c provides a present pixel with data representing the present pixel as one of "continuous white pixels".

<<Neighboring-pixel Detection Unit 322d>>

Next, regarding the detection results of the black-pixel continuity detection unit 322b and the white-pixel continuity detection unit 322c, a neighboring-pixel detection unit 322d examines whether or not continuous black pixels or continuous white pixels exist in the vicinity of a present cell being processed by the neighboring-pixel detection unit 322d so as to judge which of an edge field or a non-edge field the present pixel exists in. More specifically, in the present embodiment, when one or more continuous black pixels and one or more continuous white pixels exist within a block consisting of a 5×5 pixel matrix, the neighboring-pixel detection unit 322d judges the block as an edge field; otherwise, the neighboring-pixel detection unit 322d judges the block as a non-edge field.

<<Isolated-point Elimination Unit 322e>>

Further, since character edges exist continuously, an isolated-point elimination unit 322e corrects an isolated edge to a non-edge field. Then, the isolated-point elimination unit 322e outputs an "edge" signal valued "1" (indicating an edge field) with respect to a pixel judged as an edge field, and outputs the "edge" signal valued "0" (indicating a non-edge field) with respect to a pixel judged as a non-edge field.

<White-field Extraction>

<<White-field Extraction Unit 323>>

Figure 7:
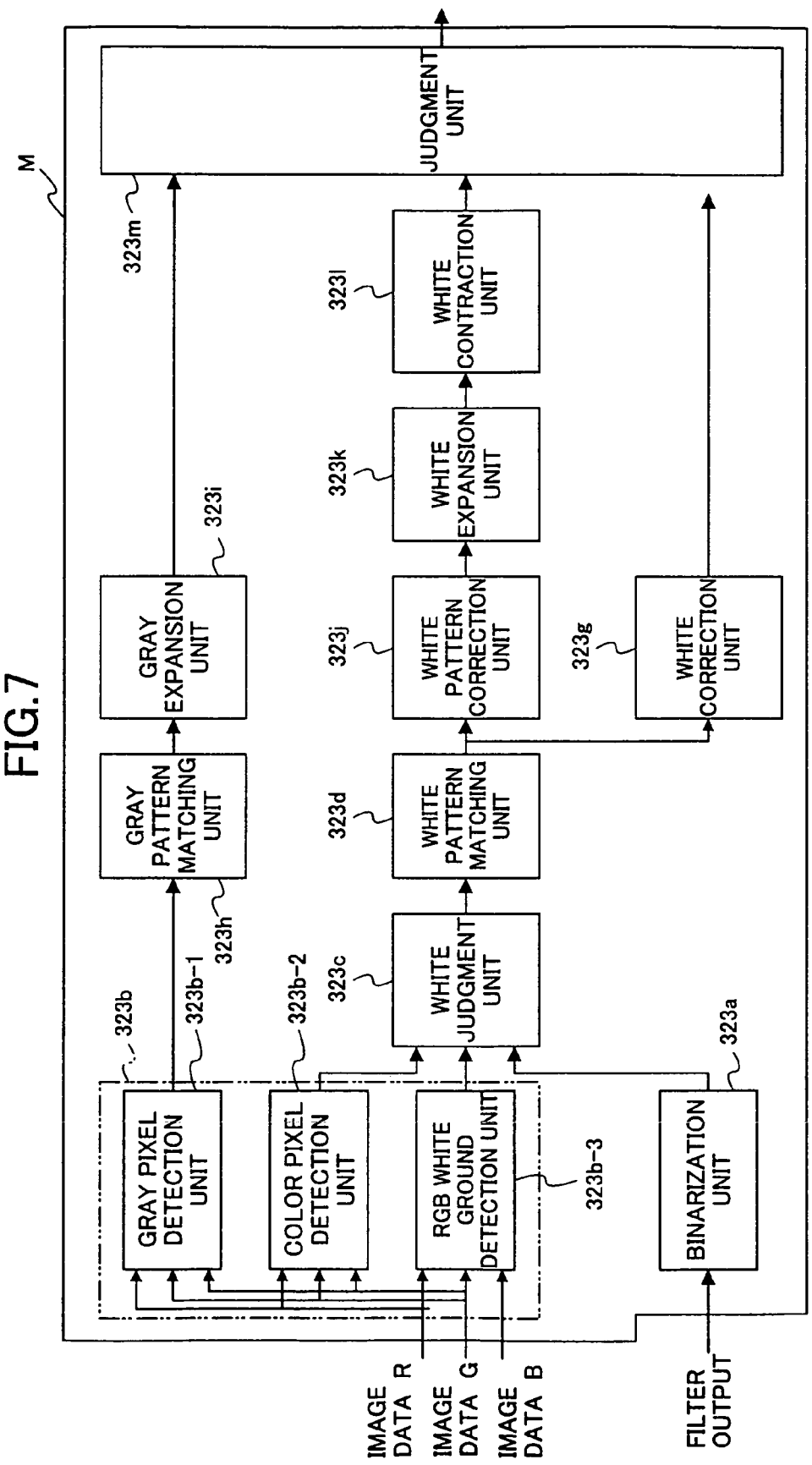
FIG. 7 is a block diagram showing a detailed structure of a white-field extraction unit shown in FIG. 4.

The white-field extraction unit 323 shown in FIG. 4 comprises a binarization unit 323a, an RGB white extraction unit 323b, a white judgment unit 323c, a white pattern matching unit 323d, a white pattern correction unit 323j, a white expansion unit 323k, a white contraction unit 323l, a white correction unit 323g, a gray pattern matching unit 323h, a gray expansion unit 323i, and a judgment unit 323m, as shown in FIG. 7. It is noted that the white-field extraction unit 323 shown in FIG. 4 includes the above-mentioned elements surrounded by square M in FIG. 7.

<<Binarization Unit 323a>>

The binarization unit 323a binarizes the edge-emphasized output of the image density data (the image data of G) from the filter unit 321 by using a threshold value thwsb so as to generate a binary-white judgment signal used in producing white data which is referred to by (step S7 shown in FIG. 10 representing a process of) the white pattern matching unit 323d. In the present embodiment, the edge-emphasized output represents 256 gradations ranging from 0 to 255, with 0 indicating white with no density. The threshold value thwsb is 50, for example. When a value of the edge-emphasized output is smaller than thwsb (=50), the binarization unit 323a judges the edge-emphasized output as "binary white" so as to generate the binary-white judgment signal valued "1". When a value of the edge-emphasized output is not smaller than thwsb (=50), the binarization unit 323a generates the binary-white judgment signal valued "0".

<<RGB white extraction unit 323b>>

The RGB white extraction unit 323b performs the following detections:

1) RGB white ground detection;
2) Color ground detection; and
3) Gray pixel detection.

The RGB white extraction unit 323b performs the foregoing detections so as to judge whether or not the image data is a white field or a gray field (a medium density field).

1) RGB White Ground Detection

In this RGB white ground detection, the RGB white extraction unit 323b detects a white-ground field by using the image data of R, G and B so as to activate an operation of a white background separation, i.e., to start a process of a white background separation. Specifically, as indicated by a pattern WBP shown in FIG. 8, when each of the image data of R, G and B in a 3×3 pixel matrix is smaller than a threshold value thwss, the RGB white extraction unit 323b judges a present pixel (a central pixel in the 3×3 pixel matrix) as a white field so as to make (a white-ground judgment signal referred to by step S3 shown in FIG. 10 representing a process of) the white pattern matching unit 323d active ("1"). Thereby, it is detected whether or not there exists a white-pixel field having a certain expanse. Besides, in the present embodiment, each of the image data of R, G and B also represents 256 gradations ranging from 0 to 255, with 0 indicating a basic level with no density. The threshold value thwss is smaller than the threshold value thwsb, and is 40, for example. When each of the image data of R, G and B is smaller than thwss (=40), the RGB white extraction unit 323b judges the pixels as a "white ground" so as to generate the white-ground judgment signal valued "1". When either of the image data of R, G and B is equal to or larger than thwss (=40), the RGB white extraction unit 323b generates the white-ground judgment signal valued "0".

2) Color Ground Detection

The RGB white extraction unit 323b detects a color ground so as not to judge a light color as a white background.

A. In FIG. 9, a pattern MPp shows signs of pixels in a 5×5 pixel matrix having a present pixel at the center thereof. When an RGB difference (a difference between a maximum value and a minimum value of the image data of R, G and B corresponding to one pixel) of a central pixel c3 (a pixel marked with x in each of patterns MCa to MCd) as a present pixel is larger than a threshold value thc, a color-pixel judgment signal a is valued "1" (a color pixel). When the RGB difference is not larger than the threshold value thc, the color-pixel judgment signal a is valued "0" (a black/white pixel).

B. When each of the image data of R, G and B of either of peripheral pixels Δ at one side of the present pixel (in each of the patterns MCa to MCd shown in FIG. 9) is equal to or smaller than a threshold value thwc, a one-side white judgment signal b is valued "1" (a white pixel). When the image data of R, G and B of either of the peripheral pixels Δ is larger than the threshold value thwc, the one-side white judgment signal b is valued "0" (a non-white pixel). The threshold value thwc is 20, for example.

C. When each of the image data of R, G and B of either of peripheral pixels □ at the other side of the present pixel (in each of the patterns MCa to MCd shown in FIG. 9) is equal to or smaller than the threshold value thwc, an other-side white judgment signal c is valued "1" (a white pixel). When the image data of R, G and B of either of the peripheral pixels □ is larger than the threshold value thwc, the other-side white judgment signal c is valued "0" (a non-white pixel).

D. In either of the patterns MCa to MCd shown in FIG. 9, when [a AND (exclusive NOR of b and c)="1"] stands, i.e., when [a="1"] (indicating that the present pixel is a color pixel), and b and c coincide with each other (meaning that pixels at both sides of the present pixel are white pixels, or that pixels at both sides of the present pixel are non-white pixels), a color-ground judgment signal d corresponding to the present pixel is valued "1" (a color ground). This color-ground judgment signal d is referred to by (step S6 shown in FIG. 10 representing a process of) the white pattern matching unit 323d.

The above-described pattern matching A to D is performed so as not to pick up a field around a black character as a color field when the field around the black character is slightly colored due to inaccurate positioning in RGB reading. At the colored field around the black character, (exclusive NOR of b and c) becomes "0" (meaning that pixels at one side of the present pixel are white pixels, and pixels at the other side of the present pixel are non-white pixels). In this case, the color-ground judgment signal d becomes "0" (a non-color ground). Besides, when the present pixel is a color pixel surrounded by white grounds, the color-ground judgment signal d becomes "1" (a color ground); thus, a light-color pixel can be detected as a color ground even at an area where lines are congested. Specifically, at an area where lines are congested, an originally white field is not completely read as white. In the above-described process A, when the RGB difference is small, the present pixel is not judged as a color pixel; therefore, the threshold value thwc is strictly set with respect to a white ground having a density to be compared (e.g., thwc=20, in comparison with thwss=40 and thwsb=50) so as to strictly check a white background in the processes B to D; accordingly, a light-color pixel can be accurately detected as a color ground.

Besides, upon the color ground detection, a valley-like white pixel detection may be performed. In the valley-like white pixel detection, a valley-like white pixel in a small white field which cannot be detected in the above-described RGB white ground detection is detected according to 5×5 pixel matrix distributions RDPa and RDPb of the image data of G shown in FIG. 8. Specifically, according to the 5×5 pixel matrix distribution RDPa, the following calculation is performed.

$$\mathrm{min}y = \mathrm{min}(G[1][2], G[1][3], G[1][4], G[5][2], G[5][3], G[5][4])$$

That is, a minimum density miny among pixels marked with black circles in the 5×5 pixel matrix distribution RDPa shown in FIG. 8 is extracted. Then, the following calculation is performed.

$$\mathrm{max}y = \mathrm{max}(G[3][2], G[3][3], G[3][4])$$

That is, a maximum density maxy among pixels marked with white circles in the 5×5 pixel matrix distribution RDPa shown in FIG. 8 is extracted. Then, the following calculation is performed.

$$\mathrm{min}t = \mathrm{min}(G[2][1], G[3][1], G[4][1], G[2][5], G[3][5], G[4][5])$$

That is, a minimum density mint among pixels marked with black circles in the other 5×5 pixel matrix distribution RDPb shown in FIG. 8 is extracted. Then, the following calculation is performed.

$$\mathrm{max}t = \mathrm{max}(G[2][3], G[3][3], G[4][3])$$

That is, a maximum density maxt among pixels marked with white circles in the 5×5 pixel matrix distribution RDPb shown in FIG. 8 is extracted. In the foregoing expressions, min( ) is a function detecting a minimum value, and max( ) is a function detecting a maximum value. Then, the following calculation is performed.

$$\mathrm{OUT} = ((\mathrm{min}y-\mathrm{max}y)>0) \# ((\mathrm{min}t-\mathrm{max}t)>0)$$

That is, a valley detection value OUT is either of (miny-maxy) and (mint-maxt) that is a positive value larger than the other. When this valley detection value OUT is equal to or larger than a predetermined threshold value, a present pixel (a central pixel of the 5×5 pixel matrix distribution RDPa or RDPb) is detected as a valley-like white pixel. Thus, a valley-like state of an image is detected so as to compensate for a white field that cannot be easily detected in the above-described 1) RGB white ground detection.

<<White Judgment Unit 323c>>

The white judgment unit 323c updates state variables MS and SS[I] used in a white judgment. FIG. 10 is a flowchart of processes updating the state variables MS and SS[I]. The state variable MS is associated with a pixel in a present line (a line being processed). The state variable SS[I] is associated with a pixel in a preceding line (a line having been processed immediately before the present line). Each of the state variables MS and SS[I] is 4-bit white-ground information representing a degree of white of a white ground, and is generated by the processes shown in FIG. 10. A maximum value assumed by each of the state variables MS and SS[I] is determined as 15, which means a whitest degree. A minimum value of each of the state variables MS and SS[I] is 0. In other words, each of the state variables MS and SS[I] is data representing a degree of white; as each of the state variables MS and SS[I] assumes a larger value, the value means a more intense white. Upon starting a copying operation, both the state variables MS and SS[I] are initialized to 0.

In the processes shown in FIG. 10, firstly, a state variable of a pixel (in a preceding line) one line before a present pixel being processed, i.e., white-ground information SS[I], is compared with a state variable of a pixel one pixel before the present pixel in a same present line (a preceding pixel, having been processed), i.e., white-ground information MS (step S1). When the white-ground information SS[I] of the pixel one line before the present pixel is larger than the white-ground information MS of the preceding pixel, the white-ground information SS[I] is selected as provisional white-ground information MS of the present pixel (step S2); otherwise, the white-ground information MS of the preceding pixel is selected as the provisional white-ground information MS of the present pixel. This means a selection of whiter information among peripheral pixels.

After starting the copying operation, when a white field, i.e., a white ground, is detected in the above-described 1) RGB white ground detection (the above-described white-ground judgment signal="1") (YES in step S3), the white-ground information SS[I] of the pixel one line before the present pixel is updated to 15 (step S4), and white-ground information MS of the present pixel is also valued 15 (step S5). The white-ground information MS of the present pixel is written to a main scanning position (F) of the present pixel in a line memory for the present line in a line memory LMP shown in FIG. 11, and the white-ground information SS[I] of the pixel one line before the present pixel is written to a main scanning position (F) of the present pixel in a line memory for the preceding line in the line memory LMP shown in FIG. 11 (steps S3, S4, S5). Next, the white-ground information SS[I] of the pixel one line before the present pixel is propagated to a pixel one line before the pixel one line before the present pixel, as follows (steps S14 to S17). Besides, [I] means a main scanning position of the present pixel, and [I−1] means a position of a pixel one pixel before the main scanning position of the present pixel (a pixel immediately before the present pixel) in a main scanning direction x.

When (SS[I−1]<SS[I]−1), (SS[I−1]=SS[I]−1) is set in the line memory (steps S14, S15). That is, in the (preceding) line one line before the present pixel, when a value "SS[I]−1" obtained by subtracting 1 from white-ground information SS[I] at a position (F) of the present pixel is larger (more intense in the degree of white) than white-ground information SS[I−1] at a position (E) one pixel before the position (F) of the present pixel in the main scanning direction x, the white-ground information SS[I−1] corresponding to the pixel (E) one-pixel before the position (F) of the present pixel in the line one line before the present pixel is updated to the value representing a white intensity one degree smaller than the white-ground information SS[I] at the position (F) of the present pixel.

Next, when (SS[I−2]<SS[I]−2), (SS[I−2]=SS[I]−2) is set in the line memory (steps S16, S17-S14, S15).

Next, when (SS[I−3]<SS[I]−3), (SS[I−3]=SS[I]−3) is set in the line memory (steps 316, S17-314, 315).

Similar settings are performed subsequently, and finally, when (SS[I−15]<SS[I]−15), (SS[I−15]=SS[I]−15) is set in the line memory (steps S16, S17-S14, S15). A lower-limit value MIN of the white-ground information SS[I] is 0. When the white-ground information SS[I] would become smaller than 0, the white-ground information SS[I] is caused to stay 0. The same applies to a hereinafter-described step S13.

By these steps S14 to S17, the white-ground information SS of pixels before the main scanning position of the present pixel in the line one line before the present pixel are updated to values obtained by reducing the white-ground information MS of the present pixel by a reduction rate decreasing by 1 for each one pixel shifted in the main scanning direction x so that the white-ground information MS of the present pixel is propagated at the above-mentioned reduction rate toward a direction opposite the main scanning direction x in the line one line before the present pixel (a white propagation process). However, this white propagation process applies to a case where the white-ground information SS one line before the present pixel is smaller than the white-ground information MS of the present pixel. For example, when a pixel one line before the present pixel is detected as a white ground (a white field) in the above-described 1) RGB white ground detection, the white-ground information of the pixel one line before the present pixel is the maximum value of 15, thus is not updated.

When the present pixel is updated so that the present pixel becomes a non-white ground (the above-described white-ground judgment signal="0") (NO in step S3), a procedure starting from step S6 follows the step S3. Then, when the present pixel is not a color ground (i.e., the color-ground judgment signal d output by the above-described 2) color ground detection is not valued "1"), but is a non-color ground (NO in step S6), and when the present pixel is a binary white (i.e., the binary-white judgment signal output by the binarization unit 323a is valued "1") (YES in step S7), and further when the state variable, i.e., the white-ground information MS, of the present pixel provisionally determined in steps S1 and S2 is equal to or larger than a threshold value thw1 (e.g., 13) (YES in step S8), the white-ground information MS corresponding to the present pixel is increased by 1 (step S10). In other words, the white-ground information MS is updated to a value one degree larger in white intensity. A maximum value max of the white-ground information MS is determined as 15; accordingly, when the white-ground information MS would become larger than 15, the white-ground information MS is caused to stay 15 (steps S9, S10). After the heretofore-described procedure starting from step S6 is performed, the step S5 and the steps S14 to S17 are also performed. That is, the white propagation process is performed.

When the present pixel is a non-color ground (NO in step S6), and when the present pixel is a binary white (YES in step S7), and when the white-ground information MS is smaller than the threshold value thw1 (e.g., 7) (NO in step S8), and when the white-ground information MS is equal to or larger than a threshold value thw2 (e.g., 1) (YES in step S11), and further when the present pixel is a valley-like white pixel (YES in step S12), the state variable MS is maintained intact. After this procedure is performed, the step S5 and the steps S14 to S17 are also performed. That is, the white propagation process is performed.

Otherwise, namely, when the present pixel is a color ground (YES in step S6), or when the present pixel is a non-binary white (NO in step S7), the white-ground information MS of the present pixel is decreased by 1 (step S13). In other words, the white-ground information MS is updated to a white-ground information one degree smaller in white intensity. A minimum value MIN of the white-ground information MS is 0; accordingly, when the white-ground information MS would become smaller than 0, the white-ground information MS is caused to stay 0. After this procedure is performed, the step S5 and the steps S14 to S17 are also performed. That is, the white propagation process is performed.

By the above-described generation of the white-ground information MS, white information can be propagated to peripheral pixels on the line memory LMP via the state variable (white-ground information) MS. As described above, this generation of the white-ground information MS includes a generation of the white-ground information MS corresponding to color performed as the procedure of steps S3-S4-S5-S14-S17 shown in FIG. 10 based on the RGB white-ground judgment signal that indicates a white ground when color data (each of the image data of R, G and B) is smaller than the threshold value thwss (=40), and further includes a generation of the white-ground information MS corresponding to density performed as the procedure of steps S7-S13-S5-S14~S17 shown in FIG. 10 based on the binary-white judgment signal that indicates a binary white when the edge-emphasized output of the density data (the image data of G) from the filter unit 321 is smaller than the threshold value thwsb (=50).

This white judgment unit 323c does not operate (i.e., does not perform step S4 until a white field is detected in the 1) RGB white ground detection performed in the RGB white extraction unit 323b, i.e., until the white-ground judgment signal valued "1" is generated in the above-described 1) RGB white ground detection so that the generation of the white-ground information MS corresponding to color.(steps S3-S4-S5-S14~S17) is started according to the white-ground judgment signal valued "1". Thereby, a field not judged as a white field can be prevented from being misjudged as a white pixel (a white block) in a hereinafter-described white pattern matching of the image data of G having undergone the edge-emphasizing process performed by the filter unit 321.

When the edge-emphasizing process of the filter unit 321 is applied to a character on a light color ground, data in the periphery of the character assumes a lower value (white) than original image data (color ground). Therefore, when a white pattern matching is performed only by using the data having undergone the edge-emphasizing process performed by the filter unit 321, i.e., when a white-field judgment is performed only based on the generation of the white-ground information MS corresponding to density (steps S7~S13-S5-S14~S17), the periphery of a character on a color ground is likely to be misjudged as a white ground. However, the white-ground information MS is valued at the maximum value so that the hereinafter-described white pattern matching for judging a white pixel (a white block) is applied to a field judged as a white field by the above-described generation of the white-ground information MS corresponding to color (steps S3-S4-S5-S14~S17); when the field is not detected as a white field in step S3, white-ground conditions are checked in detail further in steps starting from step S6 so as to adjust the white-ground information MS which is one of parameters used for determining whether or not to apply the white pattern matching. Accordingly, the field is prevented from being misjudged as a white pixel (a white block) in the hereinafter-described white pattern matching of the image data of G having undergone the edge-emphasizing process performed by the filter unit 321.

For example, when a present pixel is highly likely to be a color pixel, the white-ground information MS is decreased (step S13); when the present pixel is possibly likely to be a color pixel, the white-ground information MS is held at a present value (i.e., is maintained intact) (steps S11, S12~). Thereby, the present pixel is prevented from being misjudged as a white pixel (a white block) in the hereinafter-described white pattern matching, and data in the periphery of the character is prevented from assuming a lower value (white) than original image data (color ground).

With respect to a field dense with characters, the white-ground information MS is updated and propagated by the above-described processes (steps S3~S5, S6~S10, and S14~S17); thereby, a dense character field becomes less likely to be misjudged as a picture. Additionally, a field inside a character, such as a complicated character (e.g., a Chinese character "書") cannot always be detected as white by the 1) RGB white ground detection; in this case, the field is detected as white by the above-described valley-like white pixel detection so that the white-ground information MS is held at a relatively whiter value in the course from YES in step S12 to step S5. Thereby, a field inside a complicated character becomes less likely to be misjudged as a picture.

In addition, as described above, when the present pixel is a color pixel surrounded by white grounds, the color-ground judgment signal d output by the above-described 2) color ground detection becomes "1" (a color ground); thus, a light-color pixel can be detected as a color ground even at an area where lines are congested. Specifically, the threshold value thwc used to judge whether or not a periphery of the present pixel is white is set low (thwc=20) so as to strictly check whether or not the periphery of the light-color pixel (the present pixel) is a white background; accordingly, the light-color pixel can be accurately detected as a color ground. Thereby, a field inside a complicated character becomes even less likely to be misjudged as a picture.

As described above, a light-color pixel can be more strictly detected as a color ground. Therefore, when the present pixel is detected as a color ground, step S13 follows step S6 in FIG. 10, where the state variable MS is decreased so that a color ground becomes less likely to be judged as white. In addition, the threshold value thwsb used for generating the binary-white judgment signal referred to by step S7 is given a larger value (e.g., 50) than the threshold value thwss (e.g., 40) used for generating the white-ground judgment signal referred to by step S3 so that the binarization unit 323a is more likely to judge the present pixel as white when the present pixel is not judged as a color ground (NO in step S6); thus, the present pixel becomes more likely to be judged as a white field by increasing the state variable MS in step S10 following step S7.

That is, a strict white judgment, which is less likely to judge a ground as white, is performed in the 1) RGB white ground detection with the threshold value thwss being 40, and when the ground is judged as a white ground in this strict white judgment, the processes starting from step S3 and S4 makes it more likely to judge a character background as white by increasing the state variable MS. When the ground is not judged as a white ground in the foregoing strict white judgment, a strict color-ground judgment, which is more likely to judge an almost white light-color ground as a color ground, is performed, to the contrary, i.e., a result of the above-described 2) color ground detection is referred to (step S6). Then, when the pixel is not judged as a color ground, a lenient white judgment with the threshold value thwsb being 50, which is more likely to judge the ground as white, is performed, i.e., a result of the binarization unit 323a is referred to. When the ground is judged as white, the state variable MS is increased so that the character background becomes more likely to be judged as white (steps S7~S10). Due to these processes (steps S6~S10), when an irregular density background, for example, an irregularity, such as an offset, which is further lighter than a light-color pixel detected as a color ground, exists on a surface of a subject copy, the state variable MS is prevented from undergoing a large binary change in accordance with the fine irregularity on the surface of the subject copy; thus, judgments of whether or not the present pixel is a white pixel performed in the hereinbelow-described white pattern matching unit 323d are prevented from varying fractionally in a scanning direction. As a result, when a background is a light-color ground, a fine color loss (replaced by a white background) in accordance with the slight unevenness on the surface of the subject copy, such as an offset, is prevented.

<<White Pattern Matching Unit 323d>>

The white pattern matching unit 323d judges whether or not a background is white depending on whether or not continuous white pixels exist within a block consisting of a 5×5 pixel unit with a present pixel being located at the center thereof. Therefor, a white pattern matching is performed by assuming the present pixel to be a white pixel when the following expression is satisfied with respect to the present pixel.

(Non-color pixel & (white-ground information MS≧thw1 (13)) & binary white)#
(Non-color pixel & (white-ground information MS≧thw2 (1)) & valley-like white pixel & binary white)

At this point, the present pixel checked whether or not to satisfy this conditional expression has undergone the white propagation process performed in the step S5 and the steps S14 to S17 shown in FIG. 10, and "white-ground information MS" in the foregoing conditional expression is white-ground information MS[I] of the present pixel as an object of the above-mentioned checking after the white propagation process. It should be noted that this MS[I] is white-ground information having under gone the white propagation process, "I" of which is a position of the present pixel as the object of the above-mentioned checking in the main scanning direction x, and is different from a main scanning position of the present pixel as an object of the calculation of the state variable MS performed in the white judgment unit 323c.

In the foregoing conditional expression, "non-color pixel" means that the color-ground judgment signal d output by the above-described 2) color ground detection is "0". "Binary white" means that the binary-white judgment signal of the binarization unit 323a is "1" (binary white). "Valley-like white pixel" means that the result (a valley-like white pixel judgment signal) of the above-described valley-like white pixel detection indicates a valley-like white pixel. "#" means a logical addition (OR). The white pattern matching is a process of checking whether or not output judgments (white pixel or not) of the foregoing conditional expression match either of longitudinal, transverse and oblique continuity patterns PMPa to PMPd shown in FIG. 11. White circles provided in the patterns PMPa to PMPd indicate white pixels. It does not matter whether or not other blank pixels are white pixels.

When a white-pixel distribution of the 5×5 pixel matrix with the present pixel being located at the center thereof matches either of the longitudinal, transverse and oblique continuity patterns PMPa to PMPd shown in FIG. 11, the present pixel is judged to be a white-pattern pixel.

<Gray Judgment>
<<Gray Pixel Detection>>

A hue separation of R, G, B, Y, M, C and Bk is performed, and a low-density pixel is detected on an individual hue basis. The hue separation is identical to a hereinafter-described color judgment. Image data of G having undergone the edge-emphasizing process performed by the filter unit 321 is compared with thgr. When thgr is larger than the image data of G, or when the pixel is judged as a color pixel in the color ground (pixel) detection performed by the RGB white extraction unit 323b, the following operations are performed. When the following conditions are satisfied, the pixel is judged as a gray pixel. Threshold values are varied according to colors because inks of the colors have different maximum densities.

4.1) R−Y hue field boundary (ry)
R−2*G+B>0
4.2) Y−G hue field boundary (yg)
11*R−8*G−3*B>0
4.3) G−C hue field boundary (gc)
1*R−5*G+4*B<0
4.4) C−B hue field boundary (cb)
8*R−14*G+6*B<0
4.5) B−M hue field boundary (bm)
9*R−2*G−7*B<0
4.6) M−R hue field boundary (mr)
R+5*G−6*B<0
4.8) Y pixel judgment (gry)
(Being a color pixel) & (ry==1) & (yg==0) & (maximum value of RGB<thmaxy)
4.9) G pixel judgment (grg)
(Being a color pixel) & (yg==1) & (gc==0) & (maximum value of RGB<thmaxg)
4.10) C pixel judgment (grc)
(Being a color pixel) & (gc==1) & (cb==0) & (maximum value of RGB<thmaxc)
4.11) B pixel judgment (grb)
(Being a color pixel) & (cb==1) & (bm==0) & (maximum value of RGB<thmaxb)
4.12) M pixel judgment (grm)
(Being a color pixel) & (bm==1) & (mr==0) & (maximum value of RGB<thmaxm)
4.13) R pixel judgment (grr)
(Being a color pixel) & (mr==1) & (ry==0) & (maximum value of RGB<thmaxr)
4.14) When not a color pixel (grbk)
(Maximum value of RGB<thmaxbk)
4.15) Gray pixel judgment
When either of the foregoing conditions 4.8) to 4.15) is satisfied, the pixel is judged as a gray pixel. Besides, "==" is an expression of C language.

This process is performed by a gray pixel detection unit 323b-1. The RGB white extraction unit 323b comprises the gray pixel detection unit 323b-1, a color pixel detection unit 323b-2, and an RGB white ground detection unit 323b-3. Each of the image data of R, G and B is supplied to the gray pixel detection unit 323b-1, the color pixel detection unit 323b-2, and the RGB white ground detection unit 323b-3. An output of the gray pixel detection unit 323b-1 is supplied to the gray pattern matching unit 323h. A pattern matching result of the gray pattern matching unit 323h is supplied to the gray expansion unit 323i, and is subjected to an expansion process thereby. Thereafter, an output of the gray expansion unit 323i is supplied to the judgment unit 323m. The white judgment unit 323c is supplied with outputs of the color pixel detection unit 323b-2, the RGB white ground detection unit 323b-3 and the binarization unit 323a. A judgment result of the white judgment unit 323c is supplied to the white pattern matching unit 323d. A pattern matching result of the white pattern matching unit 323d is supplied to the white pattern correction unit 323j and the white correction unit 323g. A correction result of the white pattern correction unit 323j is further processed in the white expansion unit 323k and the white contraction unit 323l, and then is supplied to the judgment unit 323m. A correction result of the white correction unit 323g is supplied directly to the judgment unit 323m. Besides, subjecting the pattern matching result of the gray pattern matching unit 323h to a contraction process prior to the expansion process applied by the gray expansion unit 323i enables an elimination of isolated points. The white pattern matching unit 323d, the white pattern correction unit 323j, the white expansion unit 323k, the white contraction unit 323l and the white correction unit 323g are structures used for detecting a boundary field between white and nonwhite. The output of the white correction unit 323g indicates a line width. The output of the white contraction unit 323l indicates a white field. The output of the gray expansion unit 323i indicates a medium density. The judgment unit 323m judges the boundary field between white and nonwhite according to an order of priority of these three outputs, and supplies a result of the judgment to the comprehensive judgment unit 326. In this order of priority, a first priority is line-width information supplied from the white correction unit 323g, a second priority is medium-density information supplied from the gray expansion unit 323i, and a third priority is white-field information supplied from the white contraction unit 323l. Besides, the gray pixel-detection unit 323b-1 and the gray pattern matching unit 323h form a medium-density detection unit, the gray expansion unit 323i forms an expansion unit, and the judgment unit 323m forms a non-character edge judgment unit.

<<Gray Pattern Matching Unit 323h>>

Assuming D as a gray pixel, and bk as a pixel darker than the gray pixel, the gray pattern matching unit 323h performs the following pattern matching. Since a subject copy includes a multiple-line pattern of 200 lines, or a multiple-line pattern of 300 lines, the following patterns are employed for performing a gray detection to the subject copy.

Figure 12A:
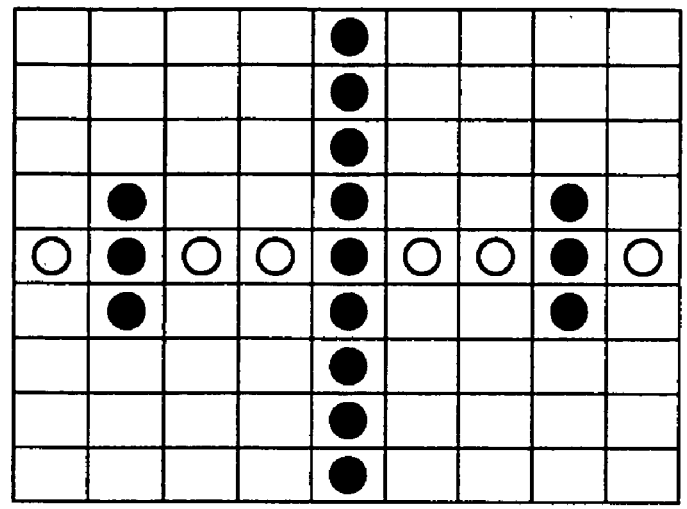
FIG. 12A shows a pattern used in a gray-pixel detection pattern matching with respect to a multiple-line pattern of 200 lines.
Figure 12B:
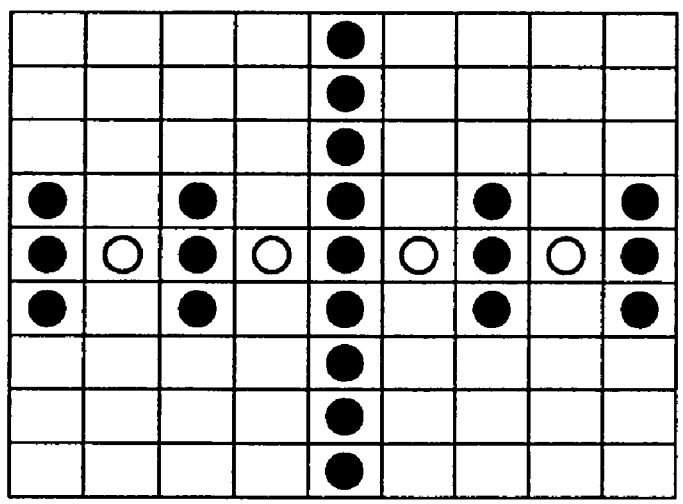
FIG. 12B shows a pattern used in a gray-pixel detection pattern matching with respect to a multiple-line pattern of 300 lines.

Pixels matching either of the following patterns are gray pixels. FIG. 12A shows a pattern used for 200 lines. FIG. 12B shows a pattern used for 300 lines.

| ( | | | | | D15& | | | | |
| | | | | | D25& | | | | |
| | | | | | D35& | | | | |
| | D32& | | | | D45& | | | D38& | |
| !BK41 | &D42& | !BK43& | !BK44 | | &D55& | !BK46& | !BK47 | &D48& | !BK49& |
| | D52& | | | | D65& | | | D58& | |
| | | | | | D75& | | | | |
| | | | | | D85& | | | | |
| | | | | | D95) | | | | |
| #( | | | | | | | | | |
| | | | | | D05& | | | | |
| | | | | | D15& | | | | |
| | | | | | D25& | | | | |
| D31& | | D33& | | | D35& | | D37& | | D38& |
| D41& | !BK42 | &D43& | !BK44 | | &D45& | !BK46 | &D47& | !BK48 | &D48& |
| D51& | | D53& | | | D55& | | D57& | | D58& |
| | | | | | D65& | | | | |
| | | | | | D75& | | | | |
| | | | | | D85) | | | | |

<<White Pattern Correction Unit 323*j*>>

The white pattern correction unit 323*j* inactivates active pixels (white pixels of 1×1, 1×2, 2×1, 2×2, 1×3, and 3×1) isolated in the white pixel pattern matching so as to eliminate the isolated pixels.

<<White Expansion Unit 323*k*>>

The white expansion unit 323*k* performs a 7×41 OR process with respect to the correction result of the white pattern correction unit 323*j*.

<<White Contraction Unit 323*l*>>

The white contraction unit 323*l* performs a 1×33, AND process with respect to the white expansion result of the white expansion unit 323*k*. The white expansion and the white contraction are performed so as to expand the correction result of the white pattern correction unit 323*j* and eliminate inactive pixels existing in a small area. This judgment result includes a boundary field on a nonwhite-ground side with respect to a white ground and a boundary part. In other words, the judgment result represents a field larger than the white ground.

<<White Correction Unit 323*g*>>

When at least one white candidate block exists in each of 6×4 pixel fields at four corners of 15×11 pixels of a block pattern BCP shown in FIG. 11 with the present pixel marked with "x" being located at the center thereof, the white correction unit 323*g* provides the present block with white block correction data. Thereby, a field surrounded by a white ground is corrected to a white field.

<<Gray Expansion Unit 323*i*>>

The gray expansion unit 323*i* performs an 11×11 OR process with respect to the pattern matching result of the gray pattern matching unit 323*h*. Thereby, a gray field detected by the gray pattern matching unit 323*h* becomes slightly larger.

<<Judgment Unit 323*m*>>

The judgment unit 323*m* detects a white background when the result of the white correction unit 323*g* is active, or when the result of the white contraction unit 323*l* is active and the result of the gray expansion unit 323*i* is inactive, as represented by the following expression.

(Result of White Correction) # [(Result of White Contraction) & ! (Result of Gray Expansion)]

In (Result of white correction), a field surrounded by a white ground is surely judged as a white field, and in [(result of white contraction) & !(result of gray expansion)], a periphery of a dark black character is judged as a white filed, and a low-density field is judged as a nonwhite field.

In FIG. 13, black protruding parts surrounded by circles Bp1 to Bp4 are replaced with white blocks by the above-described white block correction that provides the present block with the white block correction data when at least one white candidate block exists in each of the 6×4 pixel fields at the four corners of the 15×11 pixels including the present pixel being located at the center thereof. Replacing a black field surrounded by a white ground, such as the black protruding parts surrounded by the circles Bp1 to Bp4, with a white field decreases a likelihood of judging the field as a picture part. The hereinafter-described comprehensive judgment unit 326, which judges a nonwhite field as a picture, becomes less likely to misjudge a black field surrounded by a white ground, such as the black protruding parts surrounded by the circles Bp1 to Bp4, as a picture. Further, as a result of the white contraction and a result of the gray expansion, a boundary between a black ground and a white ground is judged as a white field (a character field). Accordingly, a dark edge of a character is judged as a white ground regardless of a width of the character; therefore, a character edge can be correctly judged as a character edge, and a low-density field is not judged as a character edge.

<Adjustment of Character/Photograph Judgment Level>

As described above, in the white-field extraction unit 323, the white judgment unit 323*c* generates the white-ground information MS as a state variable representing a degree of white corresponding to the white-ground judgment signal, the color-ground judgment signal d and the valley-like white pixel judgment signal of the RGB white extraction unit 323*b*, and the binary-white judgment signal of the binarization unit 323*a*. Then, the white pattern matching unit 323*d* assumes whether or not a present pixel is a white pixel according to the color-ground judgment signal d, the white-ground information MS, the binary-white judgment signal and the valley-like white pixel judgment signal, and determines whether or not the present pixel is a white pixel by performing the white-pixel distribution pattern matching with respect to the pixel matrix including the present pixel. By using this result and results of a black judgment unit and a black pattern matching unit (not shown in the figure), the white correction unit 323*g* judges whether or not the present pixel is a boundary (a white field: a character field) between a black ground and a white ground boundary. Besides, whereas the white-field extraction unit 323 has the circuit configuration shown in FIG. 7 for judging a gray pixel, the circuit structure shown in FIG. 4 is used for a white/black judgment.

The white-ground judgment signal of the RGB white extraction unit 323*b* (referred to by step S3 shown in FIG. 10) is "1" (a white ground) when each of the image data of R, G and B of a present pixel is smaller than the threshold value thwss (=40). Increasing this threshold value thwss enhances a likelihood of setting the white-ground information MS to a large value so that the above-mentioned "white field" (a boundary between a black ground and a white ground boundary: a character field) becomes more likely to be extracted (i.e., a picture field becomes less likely to be extracted). Decreasing the threshold value thwss results conversely.

The binary-white judgment signal (referred to by step S7 shown in FIG. 10) is "1" (a binary white) when the edge-emphasized output of the image data of G from the filter unit 321 is smaller than the threshold value thwsb (=50). Increasing this threshold value thwsb enhances a likelihood of setting the white-ground information MS to a large value so that the above-mentioned "white field" becomes more likely to be extracted (i.e., a picture field becomes less likely to be extracted). Decreasing the threshold value thwsb results conversely.

In subsequent steps, the image data of the "white field" is subjected to an image processing for expressing a character image clearly. Accordingly, when increasing the threshold values thwss and thwsb, the image data of the "white field" is subjected to an image processing placing high priority on a character. In subsequent steps, the image data of a nonwhite field, i.e., a picture (photograph) field, is subjected to an image processing for expressing a photograph or a picture faithfully. Accordingly, when decreasing the threshold values thwss and thwsb, the image data of the nonwhite field, i.e., the picture (photograph) field, is subjected to an image processing placing high priority on a picture (photograph).

When the color-ground judgment signal d of the RGB white extraction unit 323*b* (referred to by step S6 shown in FIG. 10) is "1" (a color ground), the white-ground information MS is decreased so that the above-mentioned "white field" becomes less likely to be extracted (i.e., a picture field becomes more likely to be extracted). Decreasing the threshold value thwc (e.g., 20) used in the processes B and C of the above-described 2) color ground detection for producing the color-ground judgment signal d enhances a likelihood of detecting the peripheral pixels (Δ and □ shown in FIG. 9) simultaneously as color pixels, i.e., enhances a likelihood of (exclusive NOR of b and c) becoming "1", so that the color-ground judgment signal d more likely becomes "1" (a color ground); thereby, the above-mentioned "white field" becomes less likely to be extracted (i.e., a picture field becomes more likely to be extracted).

Thereupon, in the present embodiment, the threshold values thwss, thwsb and thwc are adjusted as follows, in the operation/display unit OPB shown in FIG. 2, by a "character/photograph level" adjustment among parameter adjustments adjusted by operating key images (a parameter designation key and UP/DOWN keys) on a menu screen displayed on a menu display and a liquid crystal display of a key-input mode.

|  | Character oriented value | adjusted | Standard (Default) | Photograph oriented value | adjusted | |
|---|---|---|---|---|---|---|
| Parameter | 6 | 5 | 4 | 3 | 2 | 1 | 0 |
| thwss | 46 | 44 | 42 | 40 | 38 | 36 | 34 |
| thwsb | 56 | 54 | 52 | 50 | 48 | 46 | 44 |
| thwc | 26 | 24 | 22 | 20 | 18 | 16 | 14 |

That is, a standard value (a default) of the parameter "character/photograph level" to be adjusted by an operator using the operation/display unit OPB is "3". This default value along with a conversion table representing relations between the above-mentioned character/photograph level and each of the threshold values thwss, thwsb and thwc is written to a ROM 358 shown in FIG. 3. When electric power is applied to the IPU 300 shown in FIG. 3, and a CPU 357 initializes the IPU 300, the CPU 357 reads the default value of the character/photograph level from the ROM 358 so as to read the threshold values thwss, thwsb and thwc corresponding to the default value from the conversion table. Then, the CPU 357 writes the threshold values thwss, thwsb and thwc to threshold-value-specific registers provided in a RAM 356 so as to use the threshold values thwss, thwsb and thwc in the above-described processes in the white-field extraction unit 323. Thereafter, when the character/photograph level is adjusted by an input form the operation/display unit OPB, and an adjusted value A is supplied via the main controller 10 to the CPU 357, the CPU 357 reads values of parameters thwss, thwsb and thwc corresponding to the adjusted value A from the conversion table stored in the ROM 358, and writes these values of the parameters thwss, thwsb and thwc to parameter-specific registers provided in the RAM 356.

In a state where the threshold values are set at the standard values (thwss=40, thwsb=50, thwc=20), when the operator increases the "character/photograph level" ("UP") by i (for example, 1) by using the operation/display unit OPB, the threshold values thwss, thwsb and thwc are set to values varied by 2i (character oriented adjusted values) placing high priority on a character to the extent of 2i (in this example, 2). Conversely, when the operator decreases the "character/photograph level" ("DOWN") by i (for example, 1), the threshold values thwss, thwsb and thwc are set to values varied by 2i (photograph oriented adjusted values) placing high priority on a photograph to the extent of 2i (in this example, 2).

<Dot Extraction>
<<Dot Extraction Unit 324>>

Figure 14:
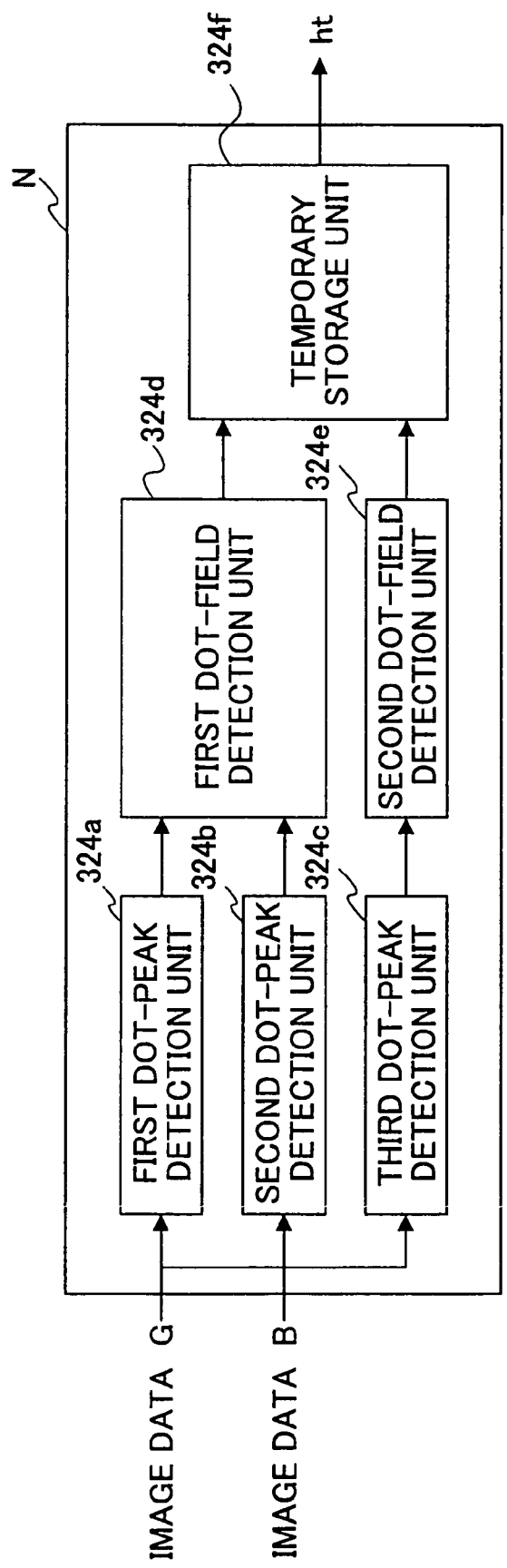
FIG. 14 is a block diagram showing a detailed structure of a dot extraction unit shown in FIG. 4.

As shown in FIG. 14, the dot extraction unit 324 comprises a first dot-peak detection unit 324a, a second dot-peak detection unit 324b, a third dot-peak detection unit 324c, a first dot-field detection unit 324d, a second dot-field detection unit 324e, and a temporary storage unit (a temporary memory) 324f. The image data of G is supplied to the first dot-peak detection unit 324a and the third dot-peak detection unit 324c. The image data of B is supplied to the second dot-peak detection unit 324b. Detection results of the first dot-peak detection unit 324a and the second dot-peak detection unit 324b are supplied to the first dot-field detection unit 324d. A detection result of the third dot-peak detection unit 324c is supplied to the second dot-field detection unit 324e. Detection results of the first dot-field detection unit 324d and the second dot-field detection unit 324e are temporarily stored in the temporary storage unit 324f. It is noted that the dot extraction unit 324 shown in FIG. 4 corresponds to a unit N shown in FIG. 14.

The first dot-peak detection unit 324a is a circuit using the image data of G for detecting a pixel (referred to as a dot-peak pixel) composing a part of halftone dots from pixel density information within a two-dimensional local field having a predetermined size. When the following two conditions are satisfied with respect to the local field at the same time, a central pixel within the field is detected as the dot-peak pixel.

Condition 1: The central pixel has a maximum (mountain-peak) or a minimum (valley-peak) density level within the local field.

Condition 2: An absolute value of a difference between an average of density levels of each pair of pixels symmetric with respect to the central pixel and the density level of the central pixel is equal to or larger than a threshold value Th.

A specific description will be given, with reference to FIG. 15, of the detection process of the first dot-peak detection unit 324a. In the following example, a mask of a 5×5 pixel matrix (a M×M pixel matrix when generalized) is used as the local field. Assuming that the pattern MPp shown in FIG. 9 represents signs of pixels in the 5×5 pixel matrix, when a density Lc of the central pixel c3 as a present pixel is maximum or minimum compared to densities L1 to L8 of peripheral pixels thereof, and when:

abs $(2Lc-L1-L8) \geq Lth$; and
abs $(2Lc-L2-L7) \geq Lth$; and
abs $(2Lc-L3-L6) \geq Lth$; and
abs $(2Lc-L4-L5) \geq Lth$, the central pixel (c3) of the mask is detected as the dot-peak pixel. "abs" is a function for obtaining an absolute value. "Lth" is a threshold value (a constant value).

Specifically, in FIG. 15, the peripheral pixels are pixels marked with squares in a peripheral-pixel distribution pattern Mpa or MPb. When either of the first dot-peak detection unit 324a and the second dot-peak detection unit 324b based on the peripheral-pixel distribution pattern Mpa or MPb detects the central pixel c3 as the dot-peak pixel, the present pixel (the central pixel c3) is provided with a detection signal indicating a dot-peak pixel. The two patterns are used so as to widely correspond to numbers of lines of dots.

In the pattern Mpa,
L1=b2, L2=b3, L3=b4,
L4=c2, L5=c4, L6=d2,
L7=d3, L8=d4.

It is noted that L1=b2 means that a density of the pixel b2 is the density L1 used in the above-described dot-peak pixel detection operation.

In the pattern Mpb,
L1=b2, L2=a3, L3=b4,
L4=c1, L5=c5, L6=d2,
L7=e3, L8=d4.

Additionally, in a case of copying, a magnification and a reduction in the sub scanning direction y are performed according as a low/high subject-copy scanning velocity of the scanner 200. Thus, image data having undergone the magnification and the reduction in the sub scanning direction y is supplied from the scanner 200. Thereupon, in the case of reduction, patterns Mpc and MPd shown in FIG. 15 are used in place of the above-mentioned patterns Mpa and MPb. In the case of magnification, patterns Mpe and MPf shown in FIG. 15 are used in place of the above-mentioned patterns Mpa and MPb. Besides, in the patterns Mpe and MPf, pixels marked with triangles may be included in the above-mentioned peripheral pixels.

The second dot-peak detection unit 324*b* detects a dot peak by using the image data of B, and has the same function as the first dot-peak detection unit 324*a*. The first dot-peak detection unit 324*a*, which uses the image data of G detects dot peaks of substantially all colors except Y. Thereupon, the second dot-peak detection unit 324*b* is an auxiliary circuit using the image data of B so as to detect a dot peak of Y.

The first dot-field detection unit 324*d* counts mountain/valley-dot-peak pixels detected by either of the first dot-peak detection unit 324*a* and the second dot-peak detection unit 324*b*, on the basis of an individual two-dimensional small field having a predetermined size, and determines a total of the mountain/valley-dot-peak pixels as a discrete value P of the individual small field. When this discrete value P is larger than a threshold value Pth, the first dot-field detection unit 324*d* judges all pixels in the small field (or only the central pixel in the small field, in a process on an individual pixel basis) as a dot field. A result of this judgment is stored in the temporary memory 324*f*.

A specific description will be given, with reference to FIG. 16A and FIG. 16B, of a detection process of the third dot-peak detection unit 324*c*.

The detection process of the third dot-peak detection unit 324*c* is performed so as to detect a dot-peak pixel of equal to or less than 100 lines and equal to or more than 65 lines (of dots of a newspaper). In the following example, a mask of a 7×7 pixel matrix (a M×M pixel matrix when generalized) is used as a local field. Assuming that a pattern shown in FIG. 16C represents signs of pixels in the 7×7 pixel matrix, when a density Lc of a group of central pixels as present pixels is maximum or minimum compared to densities L1 to L8 of peripheral pixels thereof, and when:

abs $(2Lc-L1-L8) \geq Lth$; and
abs $(2Lc-L2-L7) \geq Lth$; and
abs $(2Lc-L3-L6) \geq Lth$; and
abs $(2Lc-L4-L5) \geq Lth$, the central pixel (d4) of the mask is detected as the dot-peak pixel. "abs" is a function for obtaining an absolute value. "Lth" is a threshold value (a constant value).

Specifically, in FIG. 16A and FIG. 16B, the peripheral pixels are pixels patterned as peripheral-pixel distributions. When either of the first dot-peak detection unit 324*a* and the second dot-peak detection unit 324*b* based on the peripheral-pixel distribution patterns detects the central pixel d4 as the dot-peak pixel, the present pixel (the central pixel d4) is provided with a detection signal indicating a dot-peak pixel. The two patterns are used so as to widely correspond to proportions of a dot-area.

The density Lc is obtained by referring to peripheral pixels, as follows:

Lc=Min(d4, d3, d5, c4, e4)

It is noted that Lc=Min(d4, d3, d5, c4, e4) means that the density Lc is a minimum value among densities of the pixels d4, d3, d5, c4 and e4.

When the density Lc is a maximum value with respect to the peripheral pixels, the pattern is determined as follows.

L1=Max(a1, a2, b1)
L2=Max(a3, a4, a5)
L3=Max(a6, a7, b7)
L4=Max(c1, d1, e1)
L5=Max(c7, d7, e7)
L6=Max(f1, g1, g2)
L7=Max(g3, g4, g5)
L8=Max(g6, g7, f7)

It is noted that L1=Max(a1, a2, b1) means that a maximum value among densities of the pixels a1, a2 and b1 is the density L1 used in the above-described dot-peak pixel detection operation.

The density Lc is obtained by referring to the peripheral pixels, also as follows.

Lc=Max(d4, d3, d5, c4, e4)

When the density Lc is a minimum value with respect to the peripheral pixels, the pattern is determined as follows.

L1=Min(a1, a2, b1)
L2=Min(a3, a4, a5)
L3=Max(a6, a7, b7)
L4=Max(c1, d1, e1)
L5=Max(c7, d7, e7)
L6=Max(f1, g1, g2)
L7=Max(g3, g4, g5)
L8=Max(g6, g7, f7)

Additionally, in a case of copying, a magnification and a reduction in the sub scanning direction y are performed according as a low/high subject-copy scanning velocity of the scanner 200. Thus, image data having undergone the magnification and the reduction in the sub scanning direction y is supplied from the scanner 200. Thereupon, in the case of reduction, the pattern shown in FIG. 16B is used. In the case of magnification, the pattern shown in FIG. 16A is used.

The dot-peak pixel detection operation of the third dot-peak detection unit 324*c* is not performed with data of individual pixels, but by referring to a plurality of pixels (in the functions "min" and "max"). In dots of a small number of lines, a cycle of dark and light parts becomes large; therefore, it is inaccurate to detect the dot-peak pixel only with data of individual pixels. Referring to the peripheral pixels reduces an influence of noises (dusts, etc.), reduces an amount of arithmetic operations, and enables the operational expression to be used commonly for other blocks. Therefore, it is easy to realize the dot-peak pixel detection operation of the third dot-peak detection unit 324*c* by means of hardware.

The second dot-field detection unit 324*e* counts mountain/valley-dot-peak pixels detected by the third dot-peak detection unit 324*c*, on the basis of an individual two-dimensional small field having a predetermined size, and determines a total of the mountain/valley-dot-peak pixels as a discrete value P of the individual small field. When this discrete value P is larger than the threshold value Pth, the second dot-field detection unit 324*e* judges all pixels in the small field (or only the central pixel in the small field, in a process on an individual pixel basis) as a dot field. A result of this judgment is stored in the temporary memory 324*f*.

When either of the judgments of the first dot-field detection unit 324*d* and the second dot-field detection unit 324*e* indicates a dot field, the threshold value Pth is adaptively varied according to dot/non-dot judgment results of processed fields in the vicinity of the present small field. In the present embodiment, two values TH1 and TH2 (TH1>TH2) are prepared as the threshold value Pth, either of which is selected according to the dot/non-dot judgment results of the processed fields in the vicinity of the present small field stored in the temporary memory 324f. That is, when the fields in the vicinity of the present small field have been judged as non-dot fields, the present small field is likely to be a line-drawing field; therefore, the value TH1 imposing a stricter condition for judging the present small field as a dot field is selected as the threshold value Pth. On the other hand, when the fields in the vicinity of the present small field have been judged as dot fields, the present small field is likely to be a dot field; therefore, the value TH2 imposing a more lenient condition for judging the present small field as a dot field is selected as the threshold value Pth. Besides, the value TH1 is selected as an initial value of the threshold value Pth.

FIG. 15 shows a small-field distribution pattern AMP of the above-described small fields. In the small-field distribution pattern AMP, each of small fields S1 to S4 is a small field (a block) of 4×4 pixels, for example. Assuming that the small field S4 is the present small field, and that the small fields S1 to S3 are the processed small fields, when all of the small fields S1 to S3 have been judged as dot fields, the value TH2 is used as the threshold value Pth for judging the present small field S4. When at least one of the small fields S1 to S3 has been judged as a non-dot field, the value TH1 is selected as the threshold value Pth. The dot extraction unit 324 outputs a dot-field detection signal ht valued "1" when detecting a dot field and valued "0" when detecting a non-dot field. As another example, the value TH2 may be selected as the threshold value Pth when at least one of the small fields S1 to S3 has been judged as a dot field, and the value TH1 may be selected as the threshold value Pth only when all of the small fields S1 to S3 have been judged as non-dot fields. Further, only the small fields S1 and S2 may be referred to as the processed fields in the vicinity of the present small.

<<Color Judgment Unit 325>>

Figure 17A:
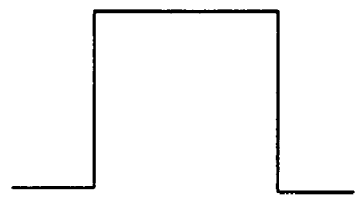
FIG. 17A to FIG. 17C are illustrations used for explaining processes of a color judgment unit shown in FIG. 4.
Figure 17B:
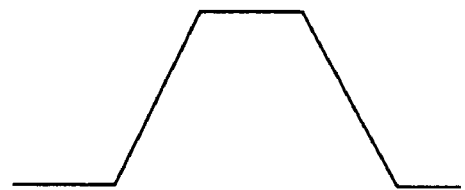
Figure 17C:
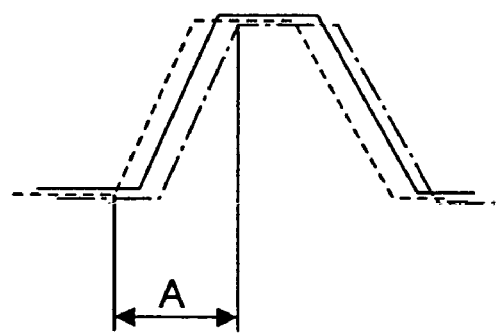

Upon detecting a color (chromatic) pixel or a black (achromatic) pixel, relative inaccuracy in reading R, G and B depends on a sampling of image data of each color or on mechanical precision. A description will be given, with respect to FIG. 17A to FIG. 17C, of this respect. FIG. 17A represents an image density signal. Ideally, a black density signal represents an optimum black when R, G and B density signals have coinciding levels high or low. However, actual image data is obtained by forming an image on the color sensor (CCD) 207 by means of the lens 206, and digitizing an image signal of the CCD 207; FIG. 17B shows an ideal high/low waveform of the image data. However, since a 3-line CCD sensor is used in a general scanner, images of R, G and B are not read at the same time. Rather, line sensors of R, G and B are arranged at equal intervals so that images of R, G and B cannot be read at the same time, inevitably causing inaccurate positioning in reading. For example, density signals of R, G and B representing black in level change shown in FIG. 17B are shifted relatively, as shown in FIG. 17C. When this shifting is large, a color shift occurs in the periphery of a black field.

<<Hue Separation Unit 325a>>

The color judgment unit 325 detects a chromatic field. The input data of R, G and B are converted into signals of c, m, y, and color-judging w (white) in a hue separation unit 325a. An example of a hue separation is as follows, obtaining boundaries of the colors, and defining an RGB difference as a difference between a maximum value and a minimum value of image data of R, G and B in one pixel. Herein, as the image data of R, G and B exhibit larger values, the image data of R, G and B represent a blacker (darker) image.

1) R-Y hue field boundary (ry)
R-2* G+B>0
2) Y-G hue field boundary (yg)
11*R-8*G-3*B>0
3) G-C hue field boundary (gc)
1*R-5*G+4*B<0
4) C-B hue field boundary (cb)
8*R-14*G+6*B<0
5) B-M hue field boundary (bm)
9*R-2*G-7*B<0
6) M-R hue field boundary (mr)
R+5*G-6*B<0
7) Color-judging w (white) pixel judgment:
When (R<thwa)&(G<thwa)&(B<thwa), y=m=c=0. "thwa" is a threshold value.
8) Y pixel judgment:
When (ry==1) & (yg==0) & (RGB difference>thy), y=1 and m=c=0. "thy" is a threshold value.
9) G pixel judgment:
When (yg==1) & (gc==0) & (RGB difference>thg), c=y=1 and m=0. "thg" is a threshold value.
10) C pixel judgment:
When (gc==1) & (cb==0) & (RGB difference>thc), c=1 and m=y=0. "thc" is a threshold value.
11) B pixel judgment:
When (cb==1) & (bm==0) & (RGB difference>thb), m=c=1 and y=0. "thb" is a threshold value.
12) M pixel judgment:
When (bm==1) & (mr==0) & (RGB difference>thm), m=1 and y=c=0. "thm" is a threshold value.
13) R pixel judgment:
When (mr==1) & (ry==0) & (RGB difference>thr), y=m=1 and c=0. "thr" is a threshold value.
14) Bk pixel judgment:
When neither of the foregoing conditions 7) to 13) is satisfied, y=m=c=1.

Further, the color-judging w pixel is judged as follows.

When (R<thw)&(G<thw)&(B<thw), the present pixel is detected as a w pixel for a color pixel, and is output as w. "thw" is a threshold value. In the foregoing operations 7) to 14), order of priority is placed on a smaller number operation. The above-mentioned threshold values thwa, thy, thm, thc, thr, thg and thb are determined prior to a copying (process). The threshold value thw is larger than the threshold value thwa. Output signals are 3-bit data comprising one bit for each of c, m and y, and 1-bit data for w of a color pixel detection for a color judgment. The threshold values are varied according to the hues so as to select a threshold value corresponding to each of the hue fields when the hue fields have different chromatic ranges. This hue separation is an example; thus, whatever other operational expressions may be used.

The outputs c, m, y and w of the hue separation unit 325a are stored in line memories 325b to 325e for five lines, and are supplied to a color-pixel judgment unit 325f.

<<Color-pixel Judgment Unit 325f>>

Figure 18:
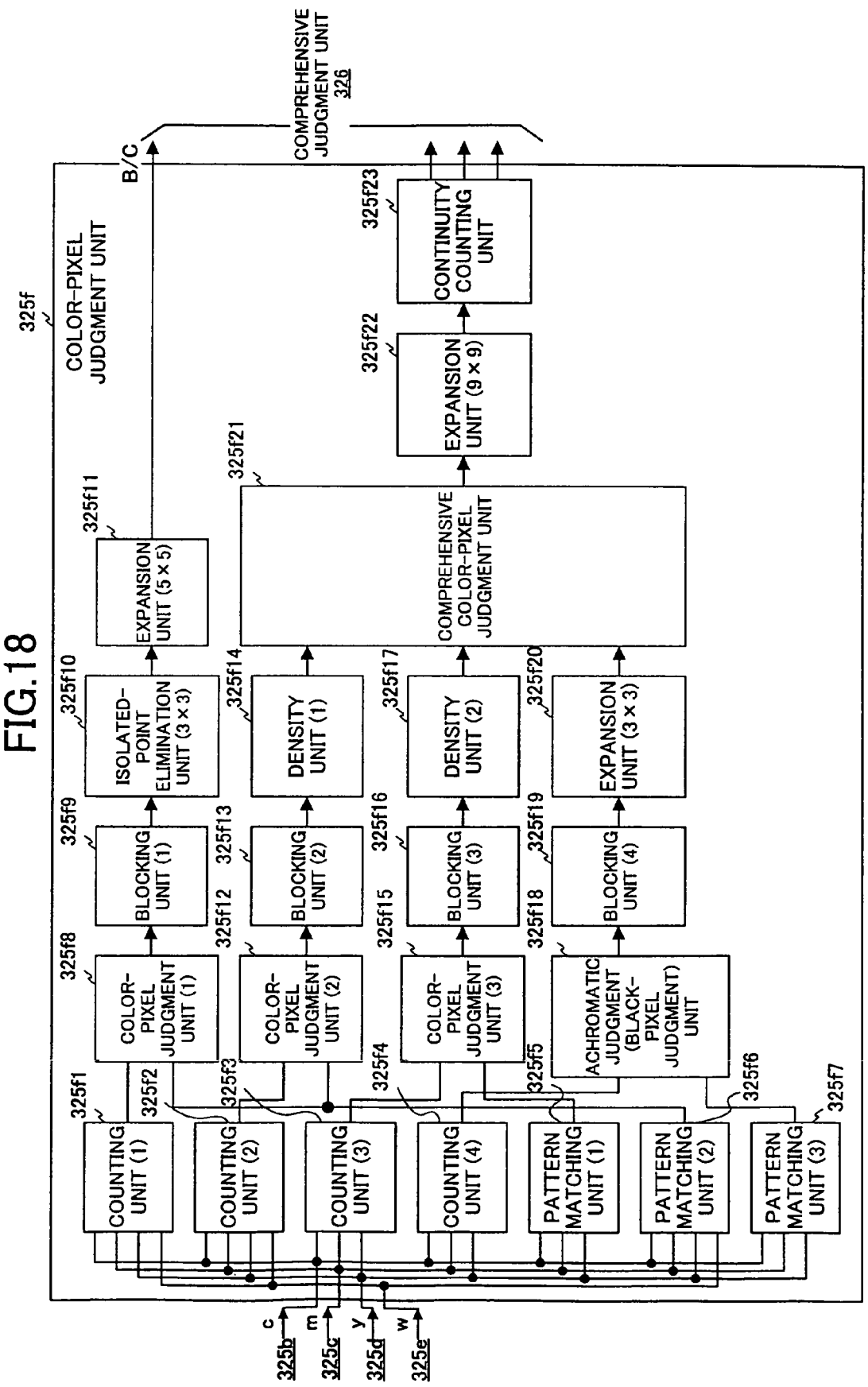
FIG. 18 is a functional block diagram illustrating a structure of a color-pixel judgment unit shown in FIG. 4.

FIG. 18 is a block diagram of the color-pixel judgment unit 325f. The data of c, m, y and w for five lines are supplied to pattern matching units 325/5 to 325/7 and counting units 325/1 to 325/4. First, a description will be given of the pattern matching unit 325/6 provided in the course of obtaining the B/C signal.

<<Pattern Matching Unit 325/6>>

When the w pixel for a color pixel exists, the data of c, m and y are corrected to c=m=y=0 of the pixel. This correction enlarges a white level of a 5×5 pixel matrix including the present pixel as a central pixel thereof. Next, it is judged whether or not the present pixel is a pixel (a color pixel) other than the pixels judged in the hue separation unit 325a as having all of c, m and y being 1 (c=m=y=1) or as having all of c, m and y being 0 (c=m=y=0), by checking whether or not the 5×5 pixel matrix matches the following patterns.

1) Color-pixel Patterns
1-1) Pattern 1-1 (pm1)
D23 & D33 & D43
1-2) Pattern 1-2 (pm2)
D32 & D33 & D34
1-3) Pattern 1-3 (pm3)
D22 & D33 & D44
1-4) Pattern 1-4 (pm4)
D24 & D33 & D42

The central pixel (the present pixel) is D33. FIG. 19 shows these patterns pm1 to pm4. Each of white circles shown in these patterns indicates that at least one of c, m and y is 1. The pattern matching is employed so as not to pick up an isolated point and the like. On the other hand, upon detecting such a small-area color as a dot, whether or not the present pixel is a pixel (a color pixel) other than the pixels judged in the hue separation unit 325a as having all of c, m and y being 1 (c=m=y=1) or as having all of c, m and y being 0 (c=m=y=0) may be judged by checking whether or not the central pixel is a pixel (a color pixel) other than the pixels having all of c, m and y being 1 (c=m=y=1) or having all of c, m and y being 0 (c=m=y=0).

2) Colored-fine-line Patterns

Figure 20:
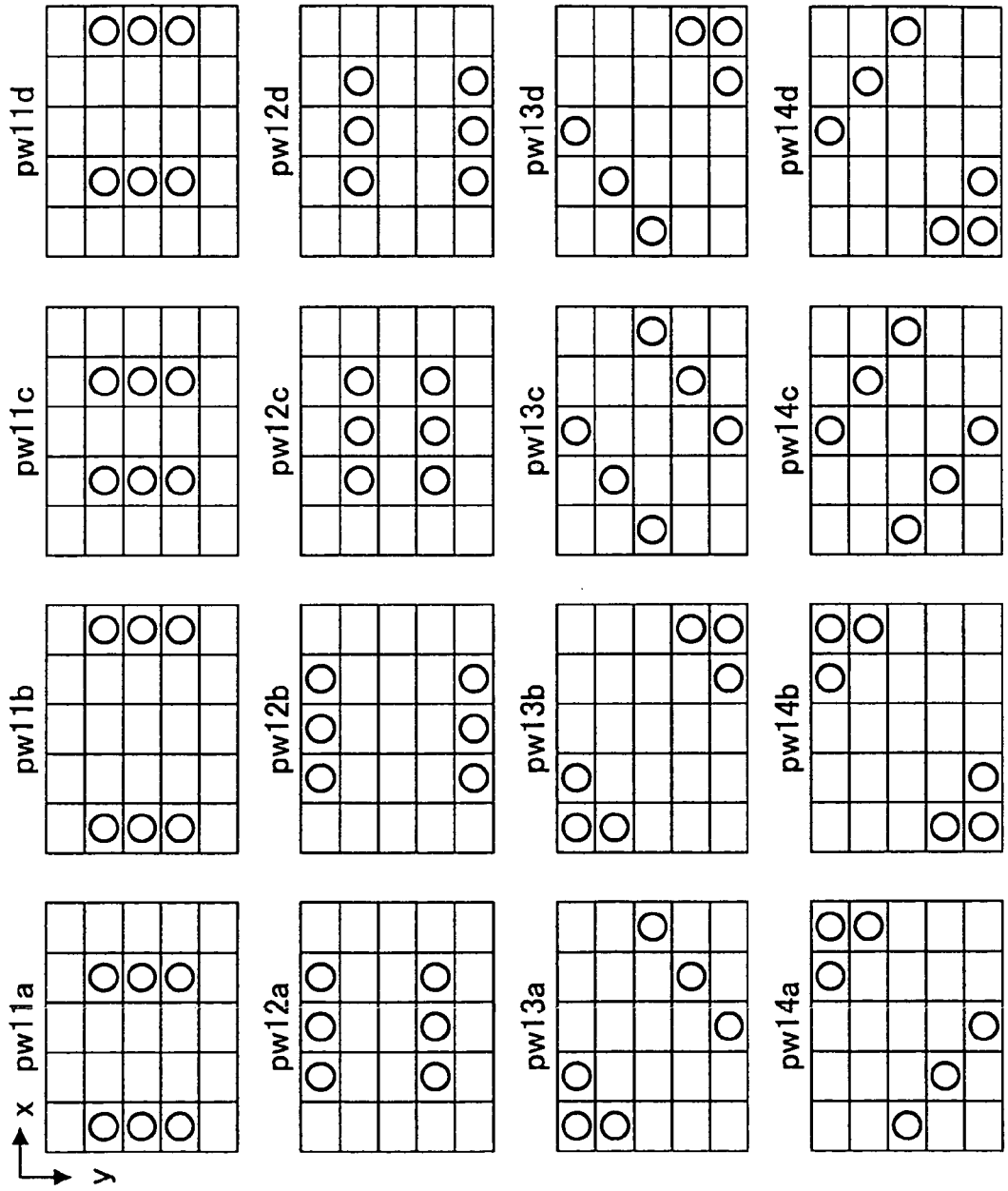
FIG. 20 shows colored-fine-line patterns used for detecting a color line surrounded by white.

A color line surrounded by white is detected. FIG. 20 shows patterns pw11a to pw14d used for this detection. In FIG. 20, each of pixels marked with a white circle has all of c, m and y being 0. When a distribution of data (c, m, y) of the 5×5 pixel matrix including the present pixel (the central pixel) matches either of the patterns pw11a to pw14d shown in FIG. 20, the present pixel (the central pixel) is considered to be a color-line pixel.

2-1) Pattern 2-1 (pw11a to pw11d)
((D12&D13&D14)&(D42&D43&D44))#
((D12&D13&D14)&(D52&D53&D54))#
((D22&D23&D24)&(D42&D43&D44))#
((D22&D23&D24)&(D52&D53&D54))
2-2) Pattern 2-2 (pw12a to pw12d)
((D21&D31&D41)&(D24&D34&D44))#
((D21&D31&D41)&(D25&D35&D45))#
((D22&D32&D42)&(D24&D34&D44))#
((D22&D32&D42)&(D25&D35&D45))
2-3) Pattern 2-3 (pw13a to pw13d)
((D11&D21&D12)&(D35&D44&D53))#
((D11&D21&D12)&(D45&D54&D55))#
((D13&D22&D31)&(D35&D44&D53))#
((D13&D22&D31)&(D45&D54&D55))
2-4) Pattern 2-4 (pw14a to pw14d)
((D13&D24&D35)&(D41&D51&D52))#
((D14&D15&D25)&(D41&D51&D52))#
((D13&D24&D35)&(D31&D42&D53))#
((D14&D15&D25)&(D31&D42&D53))

3) White-field Patterns

Figure 21:
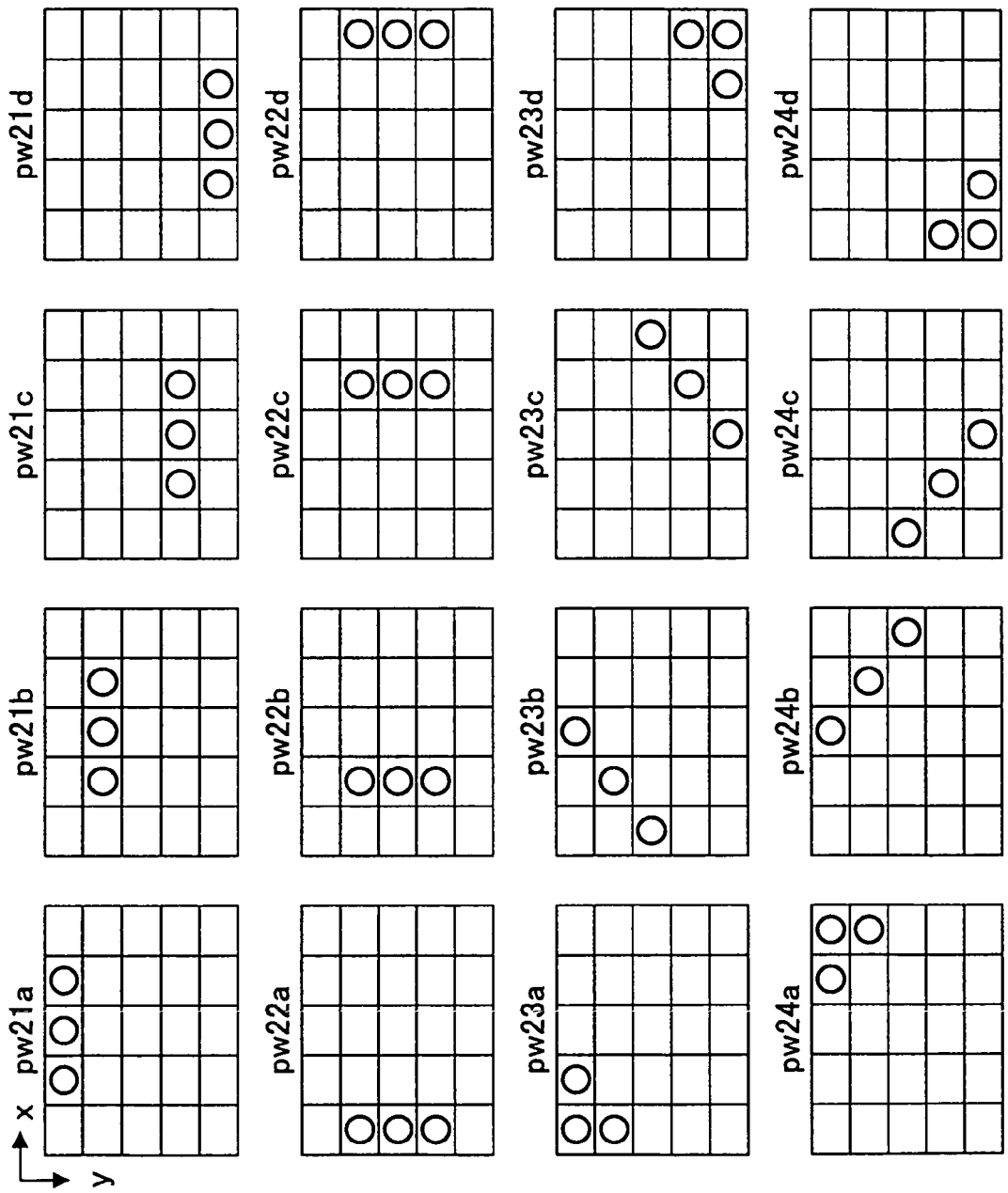
FIG. 21 shows white-field patterns used for performing a pattern matching with respect to a field having all of c, m and y being 0.

A pattern matching is performed with respect to a field having all of c, m and y being 0. FIG. 21 shows patterns pw21a to pw24d used for this pattern matching. In FIG. 21, each of pixels marked with a white circle has all of c, m and y being 0. When the distribution of data (c, m, y) of the 5×5 pixel matrix including the present pixel (the central pixel) matches either of the patterns pw21a to pw24d shown in FIG. 21, the present pixel (the central pixel) is considered to be a white-field pixel.

3-1) Pattern 3-1 (pw21a to pw21d)
(D21&D31&D41)#
(D22&D32&D42)#
(D24&D34&D44)#
(D25&D35&D45)

3-2) Pattern 3-2 (pw22a to pw22d)
(D12&D13&D14)#
(D22&D23&D24)#
(D42&D43&D44)#
(D52&D53&D54)
3-3) Pattern 3-3 (pw23a to pw23d)
(D11&D21&D12)#
(D13&D22&D31)#
(D35&D44&D53)#
(D45&D54&D55)
3-4) Pattern 3-4 (pw24a to pw24d)
(D41&D51&D52)#
(D31&D42&D53)#
(D13&D24&D35)#
(D14&D15&D25)

4) Judgment of Color-pixel Candidate 2

When the above-described pattern matching results coincide with the following pattern, the present pixel is considered to be a color-pixel candidate 2 used for a color judgment.
((pm1==1) &
((pw11==1) # (pw21 !=1))) #
((pm2==1) &
((pw12 ==1) # (pw22 !=1))) #
((pm3==1) &
((pw13 ==1) # (pw23 !=1))) #
((pm4 ==1) &
((pw14==1) # (pw24 !=1)))

Here, (pm1==1) means that the data distribution including the present pixel at the center thereof matches the pattern pm1, (pw11==1) means that the data distribution including the present pixel at the center thereof matches either of the patterns pw11a to pw11d, and (pw21 !=1) means that the data distribution including the present pixel at the center thereof matches either of the patterns pw21a to pw21d. "&" means a logical product. "#" means a logical addition. By this pattern matching, a color pixel surrounded by a white field is considered to be a color-pixel candidate; when a white field exists otherwise, the present pixel is not considered to be a color pixel. When the data distribution matches the color-pixel patterns including no white field, the present pixel becomes a color-pixel candidate.

<<Counting Unit 325/1>>

When the color-judging w pixel exists in the 5×5 pixel matrix including the present pixel at the center thereof, the data of c, m and y of the pixel judged in the hue separation unit 325a are corrected to c=m=y=0. This correction enlarges a white level of the pixel matrix. Then, the numbers of c, m and y being 1 (c=1, m=1, y=1) are counted with respect to each of the pixels in the pixel matrix. When a difference between a maximum value and a minimum value of a counted value with respect to each of c, m and y is equal to or larger than a threshold value thcnt, and the minimum value is smaller than a threshold value thmin, the present pixel is considered to be a color-pixel candidate 1. The threshold values thcnt and thmin are determined prior to a copying (process). By performing a plane expansion to c, m and y, and counting the numbers on an individual plane basis in an N×N matrix, a minimum value is assumed to be black. Thereby, when a black pixel fails to be read, a correction thereof becomes possible. Additionally, a chromatic pixel is judged from the difference between the maximum value and the minimum value. Accordingly, a pixel failed to be read as a black pixel can be corrected, and a chromatic pixel is extracted. When predetermined chromatic pixels exist in the 5×5 pixel matrix including the present pixel at the center, the present pixel is considered to be a chromatic pixel.

<<Color-pixel Judgment Unit 325/8>>

Based on the outputs of the pattern matching unit 325/6 and the counting unit 325/1, a color-pixel judgment unit 325/8 judges whether or not the present pixel is a color pixel. Specifically, when the present pixel is considered to be the color-pixel candidate 1 and the color-pixel candidate 2, the present pixel is judged to be a color pixel 1.

<<Blocking Unit 325/9>>

The output of the color-pixel judgment unit 325/8 is blocked by a blocking unit 325/9. Specifically, when at least one color pixel 1 exists in a 4×4 pixel matrix, the 4×4 pixel matrix as a whole is output as a color-pixel-1 block. In processes subsequent to the blocking unit 325/9, data is output in units of blocks, in which the 4×4 pixels form one block.

<<Isolated-point Elimination Unit 325/10>>

When other color-pixel-1 block does not exist adjacent to the present block represented by the blocked data, an isolated-point elimination unit 325/10 eliminates the blocked data as isolated points.

<<Expansion unit 325/11>>

When the color-pixel-1 block exists, an expansion unit 325/11 expands the output of the isolated-point elimination unit 325/10 to a 5×5 block so as not to subject a periphery of the color pixels to a black-character process. The B/C signal output from the expansion unit 325/11 is valued L (chromatic) corresponding to the color-pixel-1 block, and is valued H (achromatic) otherwise.

<<Counting Unit 325/2>>

When the color-judging w pixel exists in the 5×5 pixel matrix including the present pixel at the center thereof, the data of c, m and y of the pixel judged in the hue separation unit 325a are corrected to c=m=y=0. This correction enlarges a white level of the pixel matrix. Then, the numbers of c, m and y being 1 (c=1, m=1, y=1) are counted with respect to each of the pixels in the pixel matrix. When a difference between a maximum value and a minimum value of a counted value with respect to each of c, m and y is equal to or larger than a threshold value thacnt, and the minimum value is smaller than a threshold value thamin, the present pixel is considered to be a color-pixel candidate 1. The threshold values thacnt and thamin are determined prior to a copying (process).

<<Color-pixel Judgment Unit 325/12>>

Based on the outputs of the pattern matching unit 325/6 and the counting unit 325/2, a color-pixel judgment unit 325/12 judges whether or not the present pixel is a color pixel. Specifically, when the present pixel is considered to be the color-pixel candidate 1 and the color-pixel candidate 2, the present pixel is judged to be a color pixel 2.

<<Blocking Unit 325/13>>

The output of the color-pixel judgment unit 325/12 is blocked by a blocking unit 325/13. Specifically, when at least one color pixel 2 exists in a 4×4 pixel matrix, the 4×4 pixel matrix as a whole is output as a color-pixel-2 block. In processes subsequent to the blocking unit 325/13, data is output in units of blocks, in which the 4×4 pixels form one block.

<<Density Unit 325/14>>

For the purpose of eliminating an isolated block, when 3×3 blocks include three or more active conditions (the color-pixel-2 blocks), and when the present block is active (color pixels), the present block is considered to be an active block (the color-pixel-2 block).

<<Counting Unit 325/3>>

The numbers of c, m and y being 1 (c=1, m=1, y=1) are counted with respect to each of the pixels in the 5×5 pixel matrix including the present pixel at the center thereof. When a difference between a maximum value and a minimum value of a counted value with respect to each of c, m and y is equal to or larger than a threshold value thalcnt, and the minimum value is smaller than a threshold value thalmin, the present pixel is considered to be a color-pixel candidate 3. The threshold values thalcnt and thalmin are determined prior to a copying (process).

<<Pattern Matching Unit 325/5>>

The pattern matching unit 325/5 judges whether or not the pixel (c, m, y) judged in the color pixel detection is a color pixel, by pattern matching using the 5×5 pixel matrixes. The pattern matching unit 325/5 uses the same patterns as the pattern matching unit 325/6. When the distribution of data (c, m, y) of the 5×5 pixel matrix including the present pixel matches the patterns, the present pixel is considered to be a color-pixel candidate 4.

<<Color-pixel Judgment Unit 325/15>>

When the present pixel is considered to be the color-pixel candidate 3 and the color-pixel candidate 4, a color-pixel judgment unit 325/15 judges the present pixel to be a color pixel 3.

<<Blocking Unit 325/16>>

The output of the color-pixel judgment unit 325/15 is blocked by a blocking unit 325/16. Specifically, when at least one color pixel 3 exists in a 4×4 pixel matrix, the 4×4 pixel matrix as a whole is output as a color-pixel-3 block. In processes subsequent to the blocking unit 325/16, data is output in units of blocks, in which the 4×4 pixels form one block.

<<Density Unit 325/17>>

For the purpose of eliminating an isolated block, when 3×3 blocks include three or more active conditions (the color-pixel-3 blocks), and when the present block is active (color pixels 3), the present block is considered to be an active block (the color-pixel-3 block).

<<Counting Unit 325/4>>

The numbers of c, m and y judged in the hue separation unit 325a as being 1 (c=1, m=1, y=1) are counted with respect to each of the pixels in the 5×5 pixel matrix including the present pixel at the center thereof. When a minimum value of a counted value with respect to each of c, m and y is equal to or larger than a threshold value thabk, the present pixel is considered to be a black-pixel candidate 1. The threshold value thabk is determined prior to a copying (process).

<<Pattern Matching Unit 325/7>>

The pattern matching unit 325/7 performs a pattern matching of pixels of having all of c, m and y being 1 (c=m=y=1) in the 5×5 pixel matrix including the present pixel at the center thereof.

1-1) Pattern 1-1 (pm1)
D23 & D33 & D43
1-2) Pattern 1-2 (pm2)
D32 & D33 & D34
1-3) Pattern 1-3 (pm3)
D22 & D33 & D44
1-4) Pattern 1-4 (pm4)
D24 & D33 & D42

These patterns pm1 to pm4 are the same as the patterns shown in FIG. 19. In this pattern matching, each of pixels marked with a white circle has all of c, m and y being 1 (c=m=y=1). When the distribution of data of the 5×5 pixel matrix including the present pixel matches either of these patterns pm1 to pm4, the present pixel is considered to be a black-pixel candidate 2.

<<Achromatic Judgment Unit 325/18>>

When the present pixel is considered to be the black-pixel candidate 1 and the black-pixel candidate 2, an achromatic judgment unit 325/18 judges the present pixel to be a black pixel.

<<Blocking Unit 325/19>>

The output of the achromatic judgment unit 325/18 is blocked by a blocking unit 325/19. Specifically, when at least one black pixel exists in a 4×4 pixel matrix, the 4×4 pixel matrix as a whole is output as a black-pixel block. In processes subsequent to the blocking unit 325/19, data is output in units of blocks, in which the 4×4 pixels form one block.

<<Expansion Unit 325/20>>

In a matrix of 3×3 blocks, when the present block is active (the black-pixel block), and when peripheral pixels thereof are non-active (non-black pixels), an expansion unit 325/20 makes the present block non-active (a non-black-pixel block).

<<Comprehensive Color-pixel Judgment Unit 325/21>>

When the present block is judged to be active (the color pixel 2) by the color-pixel judgment unit 325/12, and is not judged to be active (the black pixel) by the achromatic judgment unit 325/18, a comprehensive color-pixel judgment unit 325/21 judges the present block to be color (a color block). Also, when the present block is judged to be active (the color pixel 3) by the color-pixel judgment unit 325/15, the comprehensive color-pixel judgment unit 325/21 judges the present block to be color (a color block).

<<Expansion unit 325/22>>

For the purpose of considering small characters as being continuous with respect to the block judged to be color by the comprehensive color-pixel judgment unit 325/21, when at least one active block exists in a matrix of 9×9 blocks including the present block at the center thereof, the present block is considered to be the active block. This expansion is performed so as to fill up a gap between characters.

<<Continuity Counting Unit 325/23>>

A continuity counting unit 325/23 judges whether the subject copy is a color subject copy or whether the subject copy is a monochrome subject copy by checking a continuity in a color-pixel block. Specifically, the continuity counting unit 325/23 counts a number of continuous color pixels in the output (the color-pixel block) of the expansion unit 325/22 so as to judge whether or not the subject copy is a color subject copy.

Figure 22:
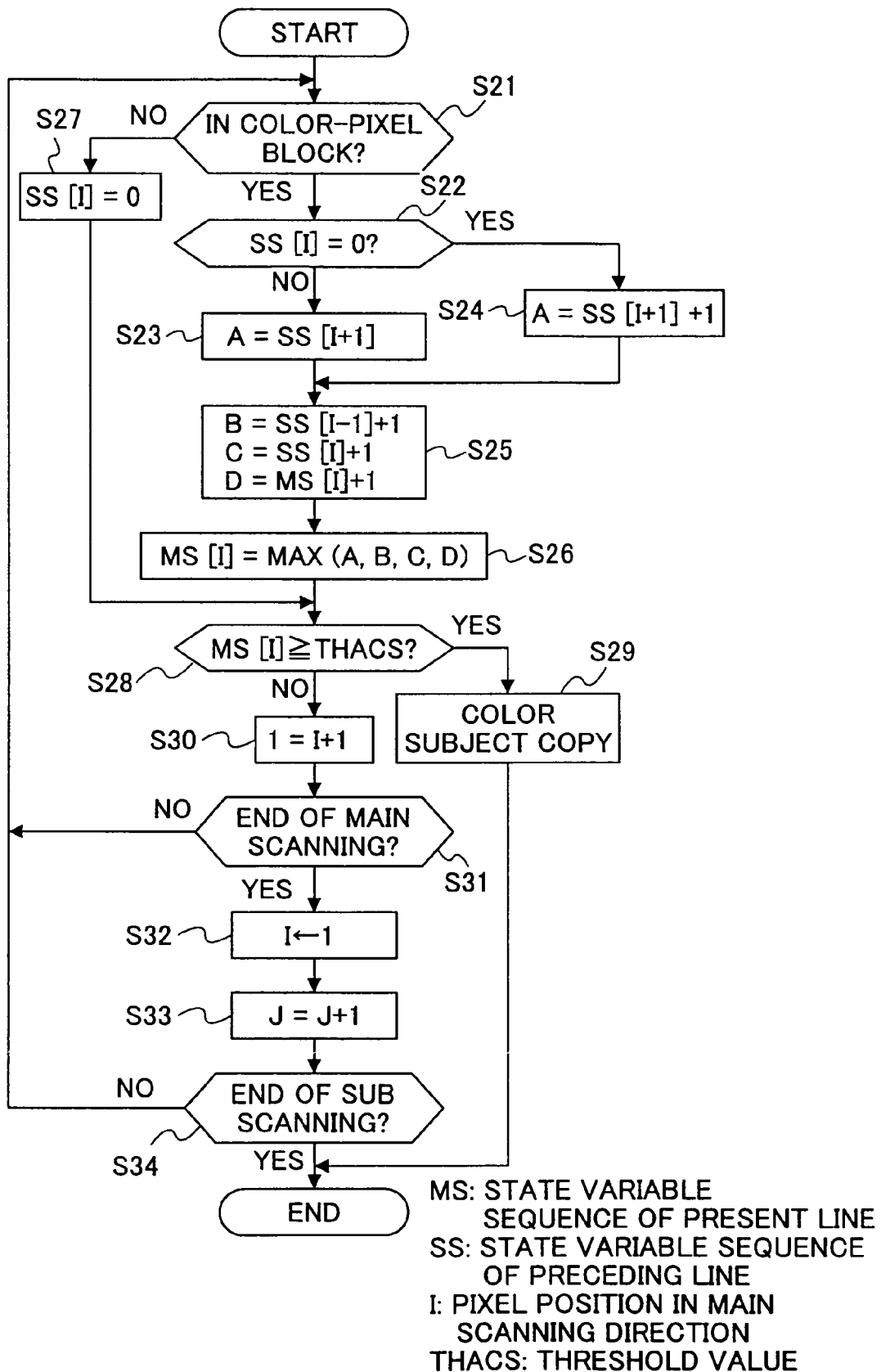
FIG. 22 is a flowchart of a judging process of a continuity counting unit shown in FIG. 18 judging whether a color subject copy or a monochrome subject copy.

FIG. 22 is a flowchart of this judging process. When the present pixel exists in the color-pixel block, numbers of continuous color pixels with respect to upper-left, upper, upper-right and left pixels of the present pixel are referred to so as to calculate the number of continuous color pixels with respect to the present pixel (steps S21 to S26). At this point, assuming that the present pixel is, for example, the pixel c3 in the 5×5 pixel distribution pattern MPp shown in FIG. 9, those upper-left, upper, upper-right and left pixels are the pixels b2, b3, b4 and c2, respectively. When the present pixel does not exist in the color-pixel block, the number of continuous color pixels with respect to the present pixel is valued 0 (steps S21 to S27).

When the present pixel exists in the color-pixel block (YES in step S21), firstly, a number of continuous color pixels with respect to the upper pixel (b3) of the present pixel (c3) is checked (step S22). When the number of continuous color pixels with respect to the upper pixel (b3) is 0 (YES in step S22), a reference value A is provided with a number of continuous color pixels with respect to the upper-right pixel (b4) plus 1 (step S24). When the number of continuous color pixels with respect to the upper pixel (b3) is not 0 (NO in step S22), the reference value A is provided with the number of continuous color pixels with respect to the upper-right pixel (b4) (step S23). Next, a reference value B is provided with a number of continuous color pixels with respect to the upper-left pixel (b2) plus 1, a reference value C is provided with the number of continuous color pixels with respect to the upper pixel (b3) plus 1, and a reference value D is provided with a number of continuous color pixels with respect to the left pixel (c2) plus 1 (step S25). Then, a maximum value among the reference values A, B, C and D is determined to be the number of continuous color pixels with respect to the present pixel (c3) (step S26).

After the number of continuous color pixels with respect to the present pixel (c3) is determined as described above, it is checked whether or not this number of continuous color pixels is equal to or larger than a predetermined value THACS (step S28). When this number is equal to or larger than the predetermined value THACS (YES in step S28), the subject copy is determined to be a color subject copy (step S29), and the process of the continuity counting unit 325/23 ends. When the above-mentioned number of continuous color pixels is smaller than the predetermined value THACS (NO in step S28), the present pixel is updated to a next pixel in the scanning directions x and y (steps S30 to S33), and the heretofore-described steps are repeated (NO in step S34). Upon completing the above-described steps for all pixels throughout the subject copy, and still, when the above-mentioned number of continuous color pixels is smaller than the predetermined value THACS (NO in step S28; steps S30 to S33; YES in step S34), the subject copy is determined to be a monochrome subject copy.

Figure 23:
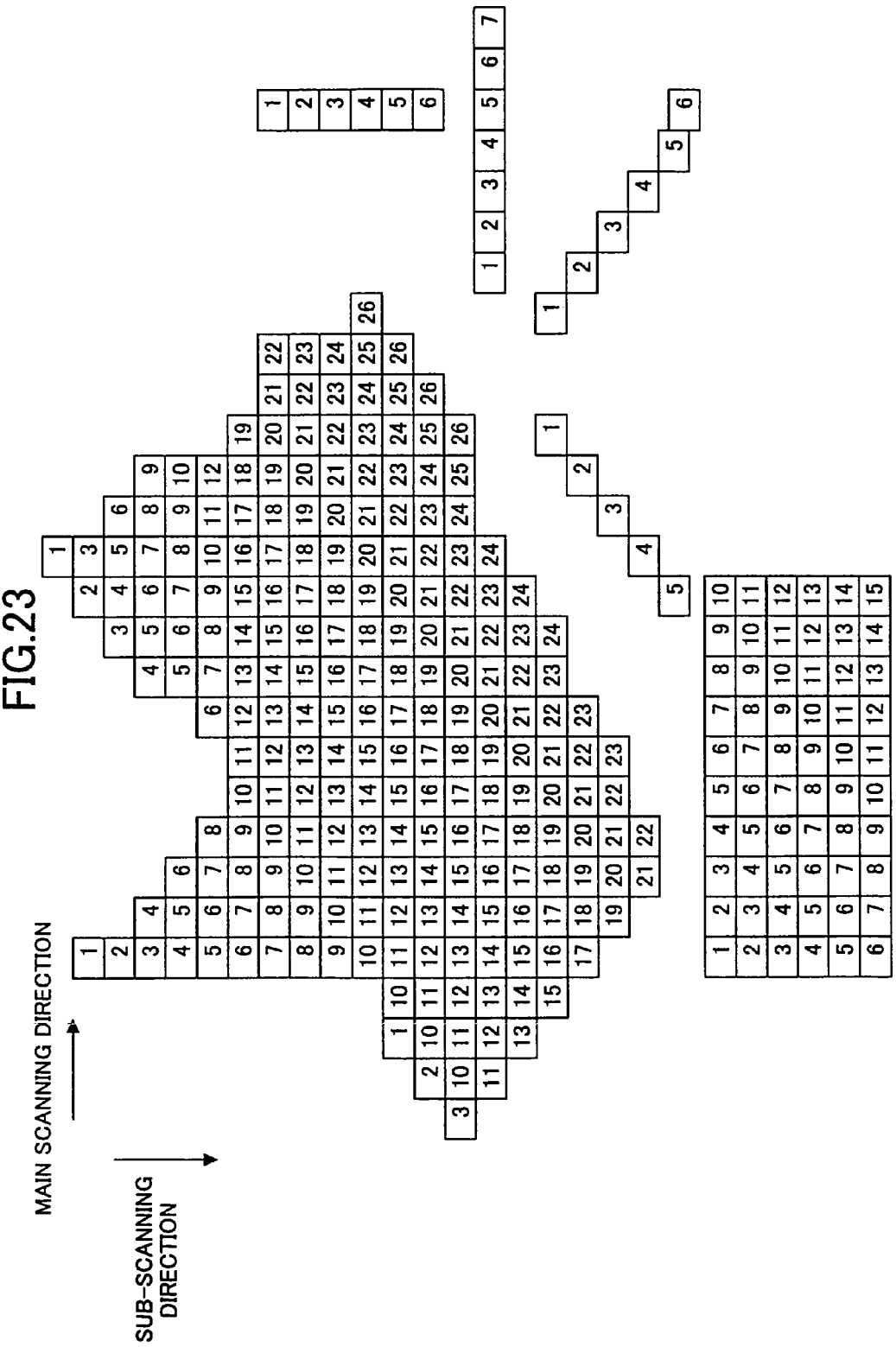
FIG. 23 shows specific data of numbers of continuous color pixels.

The above-mentioned number of continuous color pixels is a sum of a number of substantially longitudinal colored line segments and a number of transverse colored line segments. The number of continuous color pixels with respect to the upper-right pixel is treated differently so as to prevent a duplicate count. FIG. 23 shows specific data of numbers of continuous color pixels. In FIG. 23, each of small squares is a color pixel, and contains a number of continuous color pixels provided therefor. Continuous small squares containing numbers form each of color-pixel blocks shown in FIG. 23. When even one of the numbers of continuous color pixels in whichever of the color-pixel blocks formed on a same subject copy is equal to or larger than the predetermined value THACS (YES in step S28), it is decided that the subject copy is a color subject copy, not a monochrome subject copy (step S29).

The color-pixel judgment unit 325/8, the color-pixel judgment unit 325/12 and the color pixel judgment unit 325/15 are separately provided in the color-pixel judgment unit 325f so as to enhance a precision of the judgment of whether a color subject copy or a monochrome subject copy. In a color-pixel judgment performed for a black-character process, an erroneous color-pixel judgment does not stand out so conspicuously because the erroneous color-pixel judgment leaves only a local effect. By contrast, in the judgment of whether a color subject copy or a monochrome subject copy, an erroneous judgment imposes an overall influence on the subject copy as a whole. Thereupon, the counting units 325/1 to 325/4 are provided independently in the color-pixel judgment unit 325f. Essentially, the hue separation unit 325a may be divided into independent units; however, this is not preferable because dividing the hue separation unit 325a results in an increase of memory capacity in the pattern matching units 325/5 to 325/7. The increase of memory capacity is suppressed by changing parameters of color pixels (the color pixels 1 to 3) by parameters of the counting units 325/1 to 325/4 (the color-pixels candidate 1 and 3, the black-pixel candidate 1). Additionally, the color-pixel judgment unit 325/12 and the color-pixel judgment unit 325/15 are provided in the color-pixel judgment unit 325f so as to detect a low-density color, such as a yellow of a highlighter pen. Further, the achromatic judgment (black-pixel judgment) unit 325/18 is provided so as to correct an erroneously detected low-density color. Such a low-density color as a yellow of a highlighter pen can be corrected with black data within a certain width without causing a problem. Since the achromatic judgment unit 325f/18 only changes a w (white) level upon extracting a plurality of color pixels, the achromatic judgment unit 325f/18 does not have to have two memory capacities for the color-pixel detection, but the color-pixel detection is possible with one memory capacity plus one line capacity.

Since the continuity counting unit 325f/23 counts a number of continuous color pixels with respect to the present pixel by referring to count data of a line preceding a present line including the present pixel and count data of the present line, a number of continuous color pixels in the periphery of the present pixel can surely be counted. Although the hue judgment is performed to the image data of R, G and B in the present embodiment, the hue judgment may be performed to other data. For example, the hue judgment can be easily performed to a brightness color difference (e.g., Lab).

<<Comprehensive Judgment Unit 326>>

As shown in FIG. 4, the comprehensive judgment unit 326 comprises a character judgment unit 326a, an expansion process unit 326b, a character-inside judgment unit 326c and a decode unit 326d.

<<Character Judgment Unit 326a>>

Figure 24:
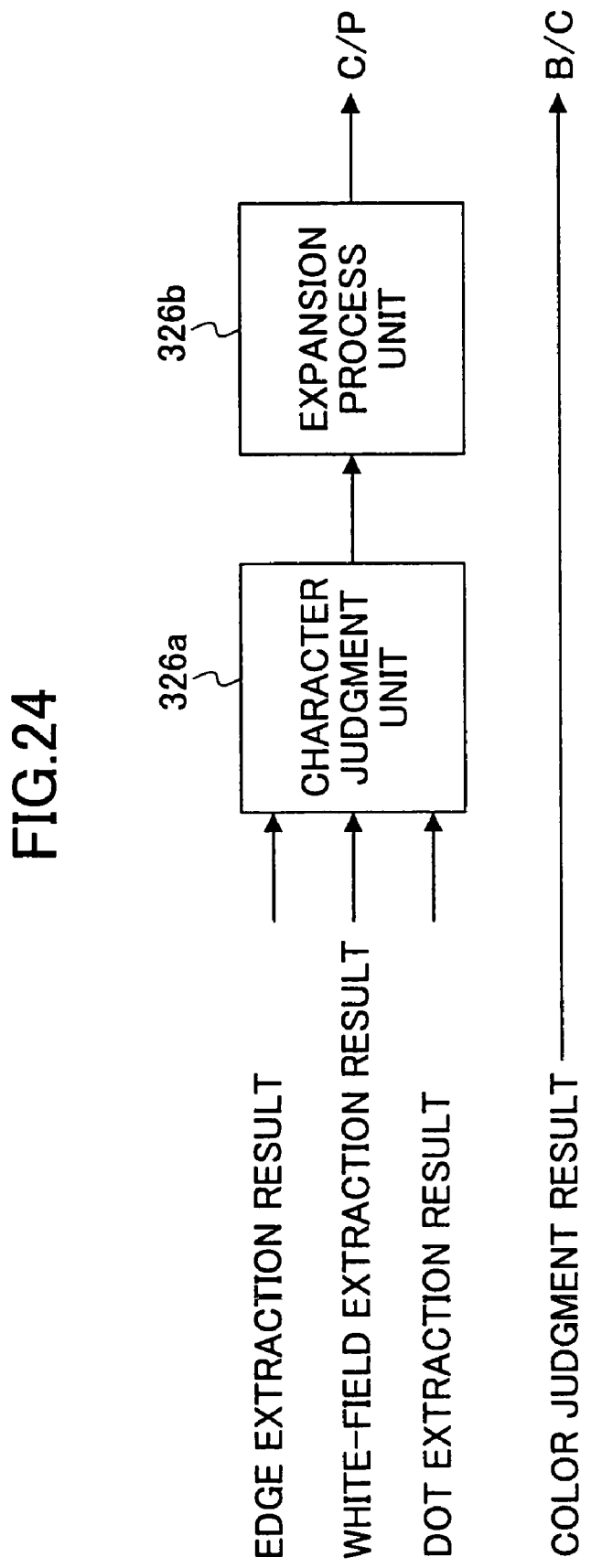
FIG. 24 is an explanatory view illustrating processes of a comprehensive judgment unit shown in FIG. 4.

When the result (the "edge" signal) of the edge extraction unit 322 indicates an edge, the result (the dot-field detection signal ht) of the dot extraction unit 324 indicates no dot, and the result of the white-field extraction unit 323 indicates a white field, the character judgment unit 326a judges the present field to be a character edge; otherwise, the character judgment unit 326a judges the present field to be a non-character-edge (a picture or an inside of a character). Then, the character judgment unit 326a supplies a result of the judgment to the expansion process unit 326b, as shown in FIG. 24.

<<Expansion Process Unit 326b>>

The expansion process unit 326b conducts an expansion to four blocks by performing an OR process of 8×8 blocks, and thereafter performing an AND process of 3×3 blocks, with respect to the result of the character judgment unit 326a. Specifically, when either of the 8×8 blocks including the present block at the center thereof is a character edge, the present block is assumed to be a character-edge block. Then, when all of the 3×3 blocks including the present block at the center thereof are character edges, the present block is determined to be a character-edge, and further a total of four blocks including the present block and adjacent three blocks thereof are determined to be character edges. The AND process is performed after the OR process because of the following reason. Especially in a case of a black character, when a small non-black-character field exists in the periphery of a black-character field, differences between processes may cause a strange feel; e.g., a black may appear lighter. To prevent this, the OR process enlarges the non-black-character field. The AND process is performed so as to obtain a desired amount of expansion.

By the way, the color-copying machine scans a subject copy four times in one copying operation. Therefore, the character judgment result varies slightly for each scanning. Especially, when a non-black-character judgment is performed in a black image formation, and a black-character judgment is performed in an image formation other than the black image formation, the black-character field becomes lighter. Therefore, upon the bk image formation, the OR process of 8×8 blocks is performed, and thereafter the AND process of 3×3 blocks is performed; upon the image formation other than the bk image formation, an OR process of 5×5 blocks is performed, and thereafter an AND process of 1×1 block is performed. Besides, performing the AND process of 1×1 block yields the same result before performing the AND process, which is equal to performing no process. The result of the expansion process (of the expansion process unit 326b) is supplied to the decode unit 326d as a character-edge signal.

Performing the expansion process as described above prevents a character field from becoming lighter due to varying separation results. This expansion process may darken an inside part of a character. However, an inside of a character being darker than an edge of the character means that a density is saturated, causing no strange feel.

Figure 25A:
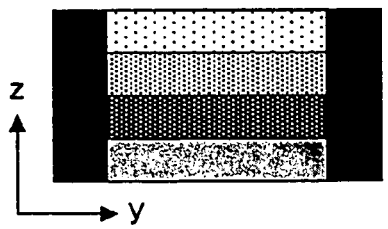
FIG. 25A to FIG. 25G are magnified views symbolically illustrating coloring materials laid over one another by a color copying.
Figure 25B:
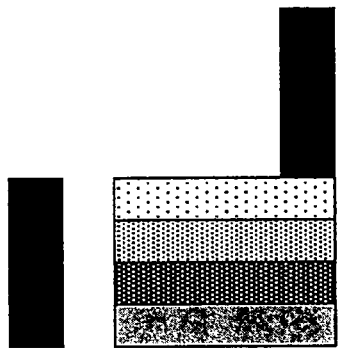
Figure 25C:
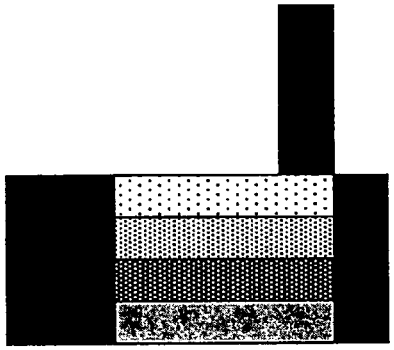
Figure 25D:
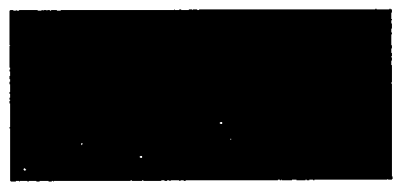
Figure 25E:
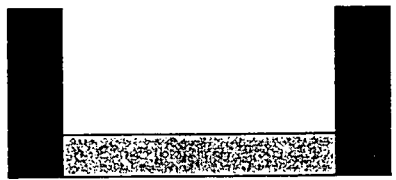
Figure 25F:
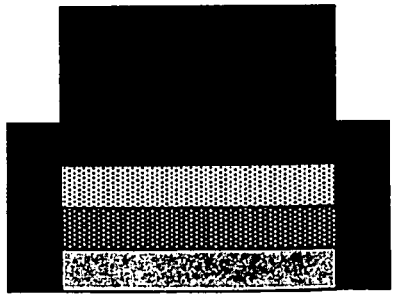
Figure 25G:
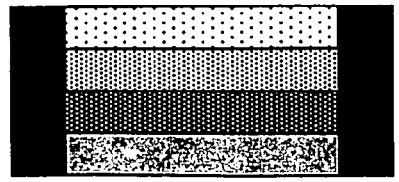

FIG. 25A to FIG. 25G are magnified views symbolically illustrating coloring materials laid over one another by a color copying. FIG. 25D shows an ideal case where all of four colors are subjected to a black-character process. FIG. 25E shows a case where all of the four colors are subjected to a black-character process, in which bk fails to be corrected, and colors other than bk are corrected so as to become light. FIG. 25F shows a preferable case where only bk is subjected to a black-character process according to the present embodiment. FIG. 25G shows a preferable case where only bk is subjected to a black-character process according to the present embodiment, in which bk is not corrected, and colors other than bk are corrected.

FIG. 25A shows an ideal case where a black-character process is performed with an identical amount of expansion. FIG. 25B shows a case where a black-character process is performed with an identical amount of expansion so that print positions are shifted (blanked white). FIG. 25C shows a case where an amount of expansion of bk is large, in which a black-character process is performed according to the present embodiment so that print positions are shifted.

<<Decode Unit 326d>>

The C/P signal output by the decode unit 326d represents as follows.

| C/P signal (OUT) | Character-edge signal (IN) | |
|---|---|---|
| 0 | Absent | |
| 1 | Present | Character edge field |

Besides, as described above, the B/C signal is output from the color judgment unit 325, as shown in FIG. 4 and FIG. 24.

Next, the description will be continued, with reference to FIG. 3 again. The C/P signal and the B/C signal generated by the subject-copy recognition unit 320 are supplied to the RGB filter unit 330, a color correction unit 340, a variable magnification unit 350, a second interface 352, a UCR unit 360, a CMYBk filter unit 370, a CMYBk γ correction unit 380 and a gradation unit 390, in a cascading manner in synchronization with the image data.

The RGB filter unit 330 is a filter performing an MTF correction to the data of R, G and B, and comprises a matrix of coefficients corresponding to a matrix of N×N pixels, and a logic obtaining a weighted average value by multiplying each of the coefficients by each of the data of R, G and B. The RGB filter unit 330 derives the weighted average value by using a matrix of coefficients suited for sharpening when the C/P signal indicates "1" (a character edge field), or by using a matrix of coefficients suited for smoothing when the C/P signal indicates "0" (a character-inside field or a picture field), and supplies the weighted average value to the color correction unit 340. The color correction unit 340 converts the data of R, G and B into data of C, M and Y by a primary masking process and so forth. The variable magnification unit 350 subjects the image data to a magnification/reduction process in the main scanning direction x, or an unchanged magnification process.

For the purpose of increasing a color reproduction of the image data, the UCR unit 360 applies a UCR (under-color removal) process to a common portion of the data of C, M and Y supplied from the color correction unit 340 so as to generate data of Bk, and outputs data of C, M, Y and Bk. When the C/P signal is not "1" (not a character edge field; i.e., a character-inside field or a picture field), the UCR unit 360 performs a skeleton black process. When the C/P signal is "1" (a character edge field), the UCR unit 360 performs a full black process. Further, when the C/P signal is "1" (a character edge field), and when the B/C signal is "H" (an achromatic field), the UCR unit 360 erases the data of C, M and Y so as to express a black character with only a black component.

An output image signal IMG of the UCR unit 360 represents one color of C, M, Y and Bk at a particular point, i.e., the output image signal IMG representing one color is output for each scanning. That is, a subject copy is read four times so as to generate full-color (four-color) data. In a monochrome copying, since one Bk image formation suffices, a subject copy is read only one time. With the mechanism (the continuity counting unit 325/23) for judging whether the subject copy is a color subject copy or a monochrome subject copy, the subject copy is read automatically for a required number of times corresponding to the subject copy; thereby, an operator does not have to judge whether the subject copy is a color subject copy or a monochrome subject copy upon copying. In the present embodiment, the B/C signal is referred to upon judging whether the subject copy is a color subject copy or a monochrome subject copy. When the B/C signal is "H" (an achromatic field) throughout the surface of the subject copy, the main controller 10 judges that the subject copy is a monochrome subject copy.

The CMYBk filter unit 370 performs smoothing and sharpening processes by using an N×N spatial filter according to a frequency characteristic of the color printer 400 and the C/P signal. The CMYBk γ correction unit 380 corrects a γ curve according to the frequency characteristic of the color printer 400 and the C/P signal. When the C/P signal is "0" (a picture field), the CMYBk γ correction unit 380 corrects the γ curve to a γ curve reproducing an image faithfully. When the C/P signal is "1" (a character edge field), the CMYBk γ correction unit 380 raises the γ curve so as to emphasize a contrast.

The gradation unit 390 performs a quantization, such as a dither process and a random dither process, according to the frequency characteristic of the color printer 400 and the C/P signal. Upon a Bk image formation, when the C/P signal is "0" (a picture field), the gradation unit 390 performs a process emphasizing a gradation; when the C/P signal is not "0" (not a picture field), the gradation unit 390 performs a process emphasizing a resolving power. Upon an image formation other than the Bk image formation, when the C/P signal is "0" (a picture field), the gradation unit 390 performs a process emphasizing a gradation; when the C/P signal is not "0" (not a picture field), the gradation unit 390 performs a process emphasizing a resolving power. The image data having undergone the heretofore-described processes is supplied via a video control 359 including a buffer memory to the color printer 400 in synchronization with operations for writing the image data.

Upon a picture process (the C/P signal="0"), the IPU 300 operates such that the RGB filter unit 330 performs a smoothing process, the UCR unit 360 performs a skeleton black process, the CMYBk γ correction unit 380 selects a curve emphasizing a linearity (gradation), and the CMYBk filter unit 370 and the gradation unit 390 perform processes emphasizing a gradation.

On the other hand, upon a character process (the C/P signal="1" and the B/C signal="L"), the RGB filter unit 330 performs an edge-emphasizing process, the UCR unit 360 performs a full black process, the CMYBk γ correction unit 380 selects a curve emphasizing a contrast, and the CMYBk filter unit 370 and the gradation unit 390 perform processes emphasizing a resolving power.

Further, as a black-character process (the C/P signal="1" and the B/C signal="H"), the data of C, M and Y are not printed upon image formations of C, M and Y except Bk so as to prevent a periphery of a black character from being colored due to position shifting. Additionally, in this case, the RGB filter unit 330 may perform a more intense edge-emphasizing process to the data of Bk than upon the above-described color character process (the C/P signal="1" and the B/C signal="L") so as to make the black character clearer.

Thus, the IPU 300 performs four types of processes for a picture, a character edge, a character on a picture, and an inside of a character.

The present invention is not limited to the specifically disclosed embodiments, and variations and modifications may be made without departing from the scope of the present invention.

The present application is based on Japanese priority application No. 2001-157490 filed on May 25, 2001, the entire contents of which are hereby incorporated by reference.

What is claimed is:

1. An image-processing device applying a predetermined process to input image data so as to output the processed image data, the image-processing device comprising:
   a medium-density detection unit detecting a medium-density field of an image represented by said image data;
   an expansion unit applying an expansion process to said medium-density field detected by said medium-density detection unit; and
   a non-character edge judgment unit judging said medium-density field applied with said expansion process by said expansion unit as a non-character edge field of said image represented by said image data; and
   wherein said image-processing device is arranged such that a high density field of a line is subjected to image processing regardless of line width.

2. An image-reading device comprising:
   an image-reading unit reading an image of a subject copy by performing a color separation to said image of said subject copy so as to generate image data; and
   an image-processing unit applying a predetermined process to said image data supplied from said image-reading unit so as to output the processed image data, the image-processing unit including:
   a medium-density detection unit detecting a medium-density field of an image represented by said image data;
   an expansion unit applying an expansion process to said medium-density field detected by said medium-density detection unit; and
   a non-character edge judgment unit judging said medium-density field applied with said expansion process by said expansion unit as a non-character edge field of said image represented by said image data; and
   wherein said image-processing device is arranged such that a high density field of a line is subjected to image processing regardless of line width.

3. An image-forming device comprising:
an image-processing unit applying a predetermined process to input image data so as to output the processed image data, the image-processing unit including:
a medium-density detection unit detecting a medium-density field of an image represented by said image data;
an expansion unit applying an expansion process to said medium-density field detected by said medium-density detection unit;
a non-character edge judgment unit judging said medium-density field applied with said expansion process by said expansion unit as a non-character edge field of said image represented by said image data; and
an image-outputting unit outputting the image by forming the image based on said processed image data output from said image-processing unit and transferring the formed image on a sheet; and
wherein said image-processing device is arranged such that a high density field of a line is subjected to image processing regardless of line width.

4. A color-copying device comprising:
an image-reading unit reading an image of a subject copy by performing a color separation to said image of said subject copy so as to generate image data;
an image-processing unit applying a predetermined process to said image data supplied from said image-reading unit so as to output the processed image data, the image-processing unit including:
a medium-density detection unit detecting a medium-density field of an image represented by said image data;
an expansion unit applying an expansion process to said medium-density field detected by said medium-density detection unit;
a non-character edge judgment unit judging said medium-density field applied with said expansion process by said expansion unit as a non-character edge field of said image represented by said image data; and
an image-outputting unit outputting the image by forming the image based on said processed image data output from said image-processing unit and transferring the formed image on a sheet; and
wherein said image-processing device is arranged such that a high density field of a line is subjected to image processing regardless of line width.

* * * * *

UNITED STATES PATENT AND TRADEMARK OFFICE
CERTIFICATE OF CORRECTION

| | | |
|---|---|---|
| PATENT NO. | : 7,663,783 B2 | Page 1 of 1 |
| APPLICATION NO. | : 11/491966 | |
| DATED | : February 16, 2010 | |
| INVENTOR(S) | : Shinji Yamakawa | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 774 days.

Signed and Sealed this

Fourth Day of January, 2011

David J. Kappos
*Director of the United States Patent and Trademark Office*